United States Patent
Graves et al.

(10) Patent No.: US 12,474,487 B2
(45) Date of Patent: Nov. 18, 2025

(54) METHODS AND SYSTEMS FOR TERRAIN-BASED LOCALIZATION OF A VEHICLE

(71) Applicant: ClearMotion, Inc., Billerica, MA (US)

(72) Inventors: William Graves, Somerville, MA (US); John Parker Eisenmann, Burlington, MA (US)

(73) Assignee: ClearMotion, Inc., Billerica, MA (US)

( * ) Notice: Subject to any disclaimer, the term of this patent is extended or adjusted under 35 U.S.C. 154(b) by 33 days.

(21) Appl. No.: 17/477,147

(22) Filed: Sep. 16, 2021

(65) Prior Publication Data
US 2022/0082705 A1    Mar. 17, 2022

Related U.S. Application Data

(60) Provisional application No. 63/079,888, filed on Sep. 17, 2020.

(51) Int. Cl.
*G01S 19/47* (2010.01)
*B60W 60/00* (2020.01)
(Continued)

(52) U.S. Cl.
CPC ........... *G01S 19/47* (2013.01); *B60W 60/001* (2020.02); *G01C 21/3461* (2013.01);
(Continued)

(58) Field of Classification Search
CPC ...... G01S 19/47; G01S 19/51; B60W 60/001; B60W 2554/4041; B60W 2552/20; B60W 2552/53; G01C 21/3461
See application file for complete search history.

(56) References Cited

U.S. PATENT DOCUMENTS

| 8,589,063 | B2 | 11/2013 | Trum |
| 10,486,485 | B1 | 11/2019 | Levinson et al. |

(Continued)

FOREIGN PATENT DOCUMENTS

| DE | 102008032545 A1 | 1/2010 |
| DE | 102014223475 A1 | 5/2016 |

(Continued)

OTHER PUBLICATIONS

International Search Report and Written Opinion mailed Jul. 8, 2022 in connection with International Application No. PCT/US2021/050687.

(Continued)

*Primary Examiner* — Vivek D Koppikar
*Assistant Examiner* — Jeffrey R Chalhoub
(74) *Attorney, Agent, or Firm* — Wolf, Greenfield & Sacks, P.C.

(57) ABSTRACT

A method of terrain-based localization of a vehicle is provided. The method may include determining the vehicle is within a threshold distance of a road segment end point and comparing a measured road profile to a reference road profile associated with the road segment. A method of identifying a track (e.g., a lane) of a road segment road profile is provided. The method may include determining if a number of stored road profiles exceeds a threshold number of road profiles and identifying one or more clusters in the stored road profiles if the threshold number is exceeded.

23 Claims, 12 Drawing Sheets

(51) Int. Cl.
*G01C 21/34* (2006.01)
*G01S 19/51* (2010.01)

(52) U.S. Cl.
CPC .......... *G01S 19/51* (2013.01); *B60W 2552/20* (2020.02); *B60W 2552/53* (2020.02); *B60W 2554/4041* (2020.02)

(56) References Cited

U.S. PATENT DOCUMENTS

| | | | |
|---|---|---|---|
| 10,565,870 | B2 | 2/2020 | Gupta et al. |
| 10,901,432 | B2 | 1/2021 | Sridhar et al. |
| 10,953,887 | B2 | 3/2021 | Magnusson et al. |
| 2013/0103313 | A1 | 4/2013 | Moore et al. |
| 2014/0195112 | A1 | 7/2014 | Lu et al. |
| 2018/0015801 | A1 | 1/2018 | Mohamed et al. |
| 2018/0024562 | A1* | 1/2018 | Bellaiche ............... B60R 1/025 701/26 |
| 2018/0079272 | A1 | 3/2018 | Aikin |
| 2019/0079539 | A1* | 3/2019 | Sridhar ............... G05D 1/0278 |
| 2019/0103019 | A1 | 4/2019 | Fowe et al. |
| 2019/0137275 | A1 | 5/2019 | Choudhury et al. |
| 2019/0362162 | A1 | 11/2019 | Averbuch et al. |
| 2020/0003897 | A1* | 1/2020 | Shroff .................. G01S 17/931 |
| 2020/0064846 | A1 | 2/2020 | Chen et al. |
| 2020/0117199 | A1 | 4/2020 | Akella et al. |
| 2020/0139784 | A1 | 5/2020 | Sridhar et al. |
| 2020/0139967 | A1 | 5/2020 | Beller et al. |
| 2020/0211394 | A1 | 7/2020 | King et al. |
| 2021/0055740 | A1 | 2/2021 | Sridhar et al. |
| 2021/0394573 | A1 | 12/2021 | Vente et al. |
| 2022/0082705 | A1 | 3/2022 | Graves et al. |

FOREIGN PATENT DOCUMENTS

| | | |
|---|---|---|
| EP | 2541203 A1 | 1/2013 |
| WO | WO 2012/019691 A1 | 2/2012 |
| WO | WO 2019/049080 A2 | 3/2019 |
| WO | WO 2019/195404 A1 | 10/2019 |

OTHER PUBLICATIONS

U.S. Appl. No. 16/130,311, filed Sep. 13, 2018, Sridhar et al.
U.S. Appl. No. 16/672,004, filed Nov. 1, 2019, Sridhar et al.
U.S. Appl. No. 17/009,243, filed Sep. 1, 2020, Sridhar et al.
U.S. Appl. No. 17/285,174, filed Apr. 14, 2021, Vente et al.
U.S. Appl. No. 17/436,012, filed Sep. 2, 2021, Jiang et al.
U.S. Appl. No. 17/489,924, filed Sep. 30, 2021, Chen et al.
U.S. Appl. No. 17/511,331, filed Oct. 26, 2021, Eisenmann et al.
U.S. Appl. No. 17/560,794, filed Dec. 23, 2021, Giovanardi et al.
U.S. Appl. No. 17/560,825, filed Dec. 23, 2021, Giovanardi et al.
U.S. Appl. No. 17/772,036, filed Apr. 26, 2022, Eisenmann et al.
U.S. Appl. No. 17/773,676, filed May 2, 2022, Eisenmann et al.

* cited by examiner

```
SLICE #1 (
        GPS Start-Point: 40.7, 50.9
        GPS End-point: 40.3, 100.9
        Rel. Start-Point: 0
        Rel End-point: 50
        Road: Smooth Pavement
        Event 1:
                Type: Bump
                Magnitude: 2
                Location: 50%
        Road Profile:
)

SLICE #2 (
        GPS Start-Point: 40.3, 100.9
        GPS End-point: 38.7, 150.9
        Rel. Start-Point: 50
        Rel End-point: 100
        Road: Smooth Pavement
        Event 1:
                Type: Manhole Cover
                Magnitude: 1
                Location: 30%
        Road Profile:
)
Slice #3 (
```

FIG. 3

```
SLICE #1 (
        GPS Start-Point: 40.7, 50.9
        GPS End-point: 40.3, 100.9
        Rel. Start-Point: 0
        Rel End-point: 50
        Road: Smooth Pavement
        LANE 1(
                Event 1:
                        Type: Bump
                        Magnitude: 2
                        Location: 50%
                Road Profile:
        )
        Lane 2(
                Event 1:
                        Type: Manhole Cover
                        Magnitude: 1
                        Location: 80%
                Road Profile:
        )
)

Slice #2 (
```

FIG. 7

|           | Profile 1 | Profile 2 | Profile 3 | Profile 4 | Profile 5 | Profile 6 | Profile 7 |
|-----------|-----------|-----------|-----------|-----------|-----------|-----------|-----------|
| Profile 1 | 1         | 0.482066  | 0.943248  | 0.995012  | 0.630473  | 0.260069  | 0.446729  |
| Profile 2 | 0.482066  | 1         | 0.454402  | 0.07877   | 0.998659  | 0.142183  | 0.967785  |
| Profile 3 | 0.943248  | 0.454402  | 1         | 0.985752  | 0.373364  | 0.595631  | 0.513914  |
| Profile 4 | 0.995012  | 0.07877   | 0.985752  | 1         | 0.248515  | 0.565336  | 0.54482   |
| Profile 5 | 0.630473  | 0.998659  | 0.373364  | 0.248515  | 1         | 0.767737  | 0.828173  |
| Profile 6 | 0.260069  | 0.142183  | 0.595631  | 0.565336  | 0.767737  | 1         | 0.702845  |
| Profile 7 | 0.446729  | 0.967785  | 0.513914  | 0.54482   | 0.828173  | 0.702845  | 1         |

FIG. 9A

| | Profile 1 | Profile 3 | Profile 4 | Profile 2 | Profile 5 | Profile 7 | Profile 6 |
|---|---|---|---|---|---|---|---|
| Profile 1 | 1 | 0.943248 | 0.995012 | 0.482066 | 0.630473 | 0.446729 | 0.260069 |
| Profile 3 | 0.943248 | 1 | 0.985752 | 0.454402 | 0.373364 | 0.513914 | 0.595631 |
| Profile 4 | 0.995012 | 0.985752 | 1 | 0.07877 | 0.248515 | 0.54482 | 0.565336 |
| Profile 2 | 0.482066 | 0.454402 | 0.07877 | 1 | 0.998659 | 0.967785 | 0.142183 |
| Profile 5 | 0.630473 | 0.373364 | 0.248515 | 0.998659 | 1 | 0.828173 | 0.767737 |
| Profile 7 | 0.446729 | 0.513914 | 0.54482 | 0.967785 | 0.828173 | 1 | 0.702845 |
| Profile 6 | 0.260069 | 0.595631 | 0.565336 | 0.142183 | 0.767737 | 0.702845 | 1 |

FIG. 9B

METHODS AND SYSTEMS FOR TERRAIN-BASED LOCALIZATION OF A VEHICLE

RELATED APPLICATIONS

This application claims the benefit of priority under 35 U.S.C. § 119(e) of U.S. Provisional Application Ser. No. 63/079,888, filed Sep. 17, 2020, the disclosure of which is incorporated herein by reference in its entirety.

FIELD

Disclosed embodiments are related to systems for terrain-based localization of a vehicle and related methods of use.

BACKGROUND

Advanced vehicle features such as, for example, active suspension or autonomous or semi-autonomous driving may rely on highly accurate localization of a vehicle. Localization-systems based on, for example, global navigation satellite systems (GNSS), may not provide sufficient accuracy or resolution in localization for such features.

SUMMARY

In some embodiments, a method for localizing a vehicle includes determining, using a terrain-based localization system, a first location of the vehicle at a first point in time; and upon determining that a distance travelled by the vehicle since the first point in time exceeds a predetermined distance, determining, using the terrain-based localization system, a second location of the vehicle at a second point in time.

In some embodiments, a method for localizing a vehicle includes obtaining an approximate location of the vehicle, determining that the approximate location is within a threshold distance of an end point of a first road segment of a series of road segments, where the first road segment is associated with a first reference road profile, and comparing a measured road profile with the first reference road profile and, based on the comparison of the measured road profile with the first reference road profile, determining a first time-point at which the vehicle is located at the end point of the first road segment, thereby localizing the vehicle to the end point of the first road segment at the first time-point.

In some embodiments, a method of estimating a number of tracks in a road segment includes obtaining a plurality of measured road profiles, where each measured road profile of the plurality of measured road profiles corresponds to a different traversal of the road segment, and upon determining that the number of measured road profiles exceeds a predetermined threshold, identifying, using a clustering algorithm, one or more clusters within the measured road profiles, where each cluster includes one or more measured road profiles, and where each road profile within a given cluster is more similar to road profiles in the associated cluster as compared to road profiles in other clusters.

In some embodiments, a method for localizing a vehicle includes transmitting at least a first merged road profile and a second merged road profile to a vehicle, comparing a measured road profile with the first merged road profile and the second merged road profile, and based on the comparisons of the measured road profile with the first merged road profile and the second merged road profile, determining that the vehicle is travelling in a first track associated with the first merged road profile.

In some embodiments, a method of localizing a vehicle includes measuring a first portion of a road profile while traversing a road with the vehicle, determining if the vehicle is within a threshold distance of a road segment end point, and upon determining the vehicle is within the threshold distance of the road segment end point comparing a reference road profile corresponding to the road segment end point to the measured first portion of the road profile, determining a correlation between the measured first portion of the road profile and the reference road profile, and determining a location of the vehicle based at least in part on the correlation.

In some embodiments, a method of mapping a road segment for terrain-based localization includes obtaining road profiles associated with the road segment, determining if a number of the road profiles exceeds a threshold number of road profiles, and upon determining the number of road profiles associated with the road segment exceeds the threshold number, identifying two or more most similar road profiles of the road profiles, determining if a degree of similarity between the two or more most similar road profiles exceeds a similarity threshold, and upon determining the degree of similarity exceeds the similarity threshold, merging the two or more most similar road profiles to form a merged road profile.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 3 depicts an exemplary embodiment of a road segment data structure;

FIG. 7 depicts another exemplary embodiment of a road segment data structure;

FIG. 9A depicts an embodiment of a correlation matrix showing the correlation coefficients for each pair of a set of seven road profiles;

FIG. 9B depicts the correlation matrix of FIG. 9A rearranged to show clusters between the seven road profiles;

DETAILED DESCRIPTION

Figure 1:
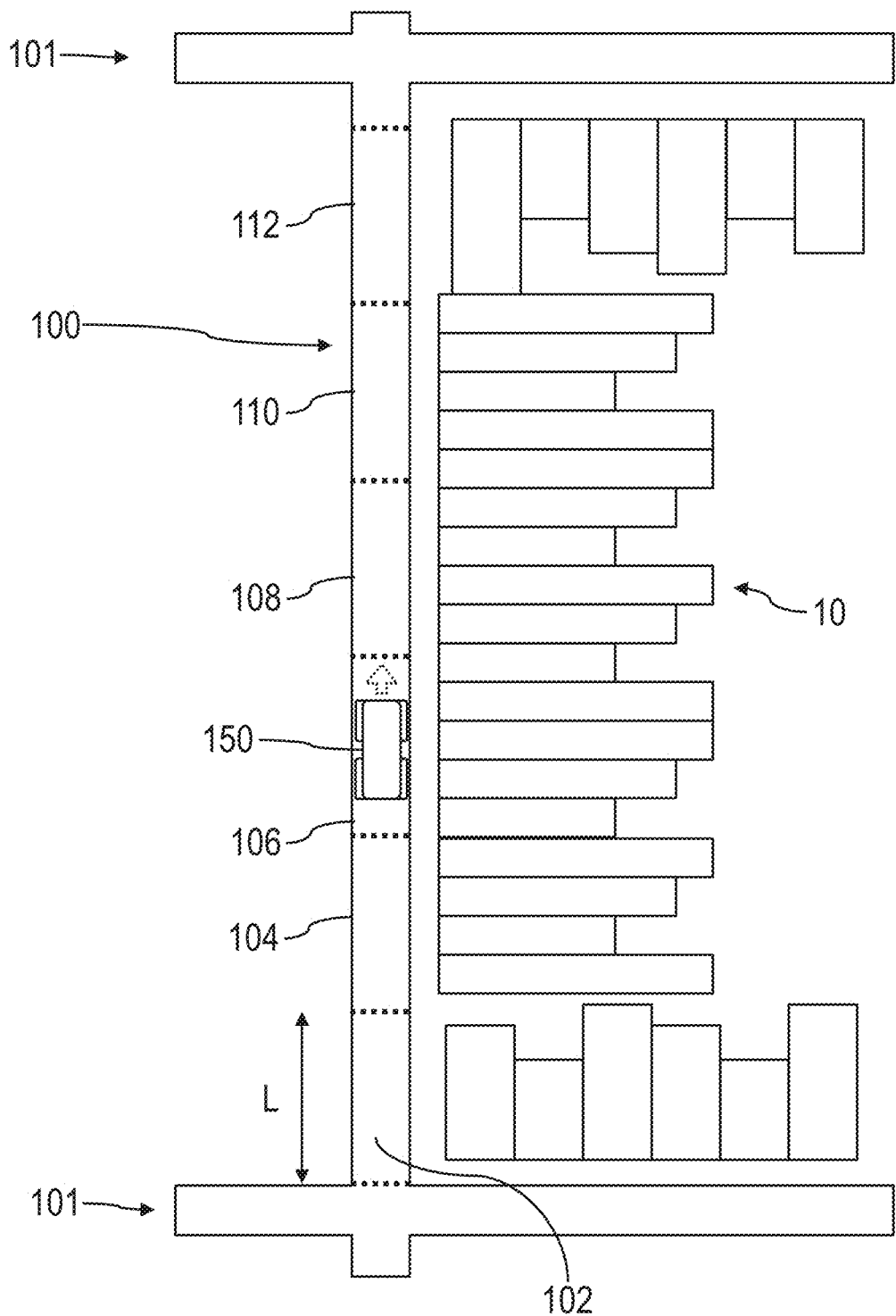
FIG. 1 depicts an embodiment of a road map including a road divided into a set of road segments.

A vehicle traveling along a road, autonomously or under the control of a driver, may interact with one or more road surface features that may expose the vehicle and/or one or more vehicle occupants to certain forces or accelerations. Such road features may affect the comfort of vehicle occupants as well as wear-and-tear of the vehicle. The magnitude, direction, and/or frequency content of such forces or accelerations may be a function of the characteristics of one or more road surface features. A typical road may include various types of road surface features, such as for example, road surface anomalies including, but not limited to potholes, bumps, surface cracks, expansion joints, frost heaves, rough patches, rumble strips, storm grates, etc.; and/or road surface properties, including but not limited to road surface texture, road surface composition, surface camber, surface slope, etc. Road surface properties may affect road surface parameters, such for example, the friction coefficient between the tires of a vehicle and the road, traction and/or road-grip. Such parameters may determine how effectively certain maneuvers, such as turning and stopping, may be performed at various speeds and vehicle loading.

The inventors have recognized the benefits of controlling operation of various systems of a vehicle based on the above-noted road surface properties and features. However, the types and characteristics of road surface features and/or properties may vary, for example, from road to road, as a function of longitudinal and/or lateral location on a given road. The effect of vehicle interaction with a given road surface feature, on the vehicle and/or an occupant, may also vary as a function of vehicle speed at the time of the interaction between the vehicle and the road surface feature. The characteristics of a road surface feature may also vary, for example, based on weather conditions, and/or as a function of time. For example, if the road surface feature is a pothole, it may gradually appear and grow, in length, width, and/or depth, over the winter months as a result of repeated freeze/thaw cycles and then be repaired in a matter of hours or less and effectively disappear. Due to the changing nature, and previously unmapped layout, of a road surface, typically vehicles have sensed the interactions of a vehicle with the road surface and then operated the various autonomous and/or semi-autonomous systems of the vehicle in reaction to the detected characteristics and road surface features the vehicle encounters.

Properties and road surface features of a road surface a vehicle might be driven over can be mapped to provide forward-looking information about the road surface features located along a path of travel of a vehicle. This information about the road surface features ahead of the vehicle may be used to, for example, dynamically tune, prepare, and/or control various automated or partially automated systems in the vehicle (such as for example, suspension systems (e.g., semi or fully active), propulsion systems, adaptive driver assistance systems (ADAS), electric power steering systems (EPS), antilock braking systems (ABS), etc.). The inventors have recognized that when there is a physical interaction between a vehicle and a road surface feature, the vehicle is exposed to one or more perceptible forces that are induced by the interaction. Thus, with a preview of the road ahead, a vehicle controller may more effectively react to road surface features when there is a physical interaction between the road surface feature and the vehicle.

While information about a road surface may be useful for the control of various systems of a vehicle, the inventors have recognized that there are challenges to obtaining and using such road surface information. One such challenge is knowing with sufficient accuracy and resolution the location of the vehicle, so that the information regarding road features ahead of the vehicle may be used to more effectively control the vehicle. For example, if the location of the vehicle is not sufficiently accurate, a vehicle controller may take an action that does not mitigate a physical interaction between the vehicle and the road feature. As another example, if the location of the vehicle is not sufficiently accurate, a vehicle controller may take an action that worsens a physical interaction between the vehicle and the road feature or otherwise worsens a vehicle occupant's comfort. For example, an accuracy on Global Navigation Satellite Systems (GNSS) location tends to be on the order of about 7 m to 30 m. With such an accuracy, a vehicle would not only be unable to tell when a vehicle would interact with a particular road surface feature (e.g., a pothole) but it also would be unable to tell if the vehicle would interact with that road surface feature in any manner.

In view of the above, the inventors have recognized that localization systems and methods incorporating terrain-based localization may offer better resolution than a purely GNSS based system. In a terrain-based localization system, as a vehicle travels along a road, a measured road profile may be obtained by measuring vertical motion of a portion of the vehicle using one or more motion sensors attached to the vehicle. This measured road profile may be compared with a reference road profile, and based at least in part on this comparison, the position of the vehicle along the road may be determined. However, the inventors have recognized that continuous pattern matching between a measured profile and a reference profile may require substantial data transmission and/or manipulation. That is, a single vehicle may need to stream sufficient road information such that the measured road profile may be continuously compared to the reference road profile while the vehicle is controlled based on the forward road information. The network bandwidth requirements may be substantial for a system employing a plurality of vehicles across an entire road network such that implementing such a network may not be commercially feasible. Additionally, continuous pattern matching between a measured profile and a reference profile may require computing power beyond what is commercially feasible to employ in a vehicle. If the computation is done remotely, such continuous pattern matching further requires network bandwidth which may already be commercially unfeasible.

In view of the above, the inventors have recognized the benefits of a road segment organizational structure for road information and related methods that provide accurate terrain-based localization in a discretized manner, thereby reducing network and computational requirements to implement terrain-based localization. Each road segment may have a predetermined length, such that a road is broken into multiple road segments. As a vehicle approaches an end point of a road segment, a road profile of the road segment may be compared with the last portion of a measured road profile with an approximately equivalent length. In this manner, a vehicle may verify its precise position based on terrain once per road segment of a predetermined length, a method which is less computationally and network bandwidth intensive.

The inventors have recognized that, given computational and/or bandwidth limitations, it may be advantageous to implement a terrain-based localization method such that the comparison between observed data and reference data occurs only at predetermined intervals (e.g., time or distance intervals). However, in between these precise determinations of a vehicle's location using terrain-based localization, a vehicle's location may become less certain as the vehicle travels further away from the last recognized road surface feature. Thus, in certain embodiments, in between these predetermined intervals and/or road surface locations, dead-reckoning may be used to estimate the location of the vehicle (e.g., the position of the vehicle along a road) based on the previously identified location (e.g., the previously identified position along the road). For example, in certain embodiments and as described in detail herein, a terrain-based localization method may include first collecting, as a vehicle travels along a road, data from one or more sensors attached to the vehicle. The collected data may be processed (e.g., transformed from time to distance domain, filtered, etc.) to obtain measured data (e.g., a measured road profile). The measured data may then be compared with reference data associated with the road (e.g., a reference or stored road profile) and, based at least in part on this first comparison, a position of the vehicle along the road at a first point in time may be determined. Once the position of the vehicle along the road at the first point in time is determined, dead reckoning may be used to track the vehicle's position as it subsequently travels along the road. During the period of dead reckoning, new data from the one or more sensors may be collected and optionally processed to yield new observed data. In certain embodiments, upon determining that the vehicle has traveled a predetermined distance since the first point in time, the new observed data may be compared with reference data. Based at least upon this second comparison, the position of the vehicle along the road at a second point in time may be determined. The process may then be repeated as the vehicle traverses sequentially located road segments, such that dead reckoning is used to track further movement of the vehicle, until it is determined that the vehicle has traveled the predetermined distance since the second point in time the location was determined. Upon this determination, terrain-based localization may be used to localize the vehicle at a third point in time. Thus, in some embodiments comparisons may be carried out intermittently at predetermined distance intervals, which may be constant intervals, instead of continuously comparing measured (e.g., the collected data and/or the processed data) data with reference data. Alternatively or additionally, terrain-based localization may be carried out upon determining that a predetermined time interval has passed since the first or previous point in time, rather than a predetermined distance interval. During these time/distance intervals, dead-reckoning may be used, exclusively or in addition to other localization systems that may be used to track the location (e.g., coordinates or position) of the vehicle based on a previously established location. Additionally, while the use of constant time and/or distance intervals are primarily disclosed herein, it should be understood that predetermined time and/or distance intervals used when determining a vehicle's location on different road segments may either be constant and/or variable between each other along different road segments as the disclosure is not limited in this fashion.

The inventors have also recognized that terrain-based determination of location for a vehicle may be supplemented by GNSS location estimations and the use of discretized road segments. That is, rather than using dead reckoning to perform terrain-based comparisons in discrete time and/or distance intervals, a location estimation from a GNSS system may be employed. For example, in certain embodiments and as described in detail herein, a terrain-based localization method may include first collecting, as a vehicle travels along a road, data from one or more sensors attached to the vehicle. The collected data may be processed (e.g., transformed from time to distance domain, filtered, etc.) to obtain measured data (e.g., a measured road profile). The measured data may then be compared with reference data associated with the road (e.g., a reference or stored road profile) and, based at least in part on this first comparison, a position of the vehicle along the road at a first point in time may be determined. Once the position of the vehicle along the road at the first point in time is determined, a GNSS may be used to track the vehicle's position as it subsequently travels along the road which may be used to determine a distance the vehicle has traveled along the road since the vehicle location was determined. During the period of GNSS tracking, new data from the one or more sensors may be collected and optionally processed to yield new observed data. In certain embodiments, upon determining that the vehicle has traveled a predetermined distance since the first point in time based at least in part on the GNSS tracking data, the new observed data may be compared with reference data. Based at least upon this second comparison, the position of the vehicle along the road at a second point in time may be determined. The process may then be repeated, such that GNSS tracking is used to track further movement of the vehicle, until it is determined that the vehicle has traveled the predetermined distance since the second point in time. Upon this determination, terrain-based localization may be used to localize the vehicle at a third point in time. Thus, in some embodiments, comparisons may be carried out intermittently at predetermined distance intervals, which may be constant intervals, or in some instances non-constant predetermined distance intervals associated with the different road segments, instead of continuously comparing measured (e.g., the collected data and/or the processed data) data with reference data. In some cases, employing a GNSS instead of dead reckoning may reduce error related to the predetermined distance. In some embodiments, GNSS may be used in combination with dead reckoning to further reduce error related to the predetermined distance, as the present disclosure is not so limited.

In some embodiments, in a road segment architecture, a given road may be segmented into a series of road segments of predetermined lengths that in some embodiments may be equal to each other, though embodiments in which road segments of unequal predetermined lengths are used are also contemplated. Each road segment may include one or more road profiles that may be employed for terrain-based localization as described herein. The road profiles may be obtained by measuring vertical motion of a portion of a vehicle using one or more motion sensors attached to the vehicle as the vehicle traverses the road segment. The road segments of predetermined equal lengths or unequal lengths may be referred to as "slices". In certain embodiments, consecutive road segments may be arranged in a contiguous fashion such that the end point of one road segment approximately coincides with the starting point of a subsequent road segment. In some embodiments, the consecutive road segments may be non-overlapping, such that an end point of one road segment coincides with a starting point of a subsequent road segment. Alternatively, in some embodiments, road segments may overlap, such that the start point of a subsequent road segment may be located within the boundaries of a previous road segment. Road segments may be, for example, any appropriate length, including, but not limited to, ranges between any combination of the following lengths: 20 meters, 40 meters, 50 meters, 60 meters, 80 meters, 100 meters, 120 meters, 200 meters or greater. In some embodiments, a road segment may have a length between 20 and 200 meters, 20 and 120 meters, 40 and 80 meters, 50 and 200 meters, and/or any other appropriate range of lengths. Other lengths that are longer or shorter than these lengths are also contemplated, as the present disclosure is not so limited. In certain embodiments, the length of the road segment into which a road is divided may depend on the type of road and/or the average speed travelled by vehicles on the road or other appropriate considerations. For example, on a single lane city road, vehicles may generally travel at relatively low rates of speed as compared to multilane highways. Therefore, on a city road (or other road with relatively low travel speeds) it may be advantageous or otherwise desirable to have relatively shorter road segments (e.g., between 20 and 60 meters) than on highways or other roads with relatively high travel speeds (e.g., between 80 and 120 meters), such that each road segment may correspond to an approximate average travel time from start to end of the road segment regardless of average travel speed on the road.

In some embodiments, a method of localizing a vehicle using road segments includes measuring a road profile with a vehicle. The method may also include determining is a vehicle is within a threshold distance of a road segment end point. For example, in some embodiments, determining the vehicle is within a threshold distance of a road segment endpoint includes estimating a location of the vehicle with a GNSS, dead reckoning from a last known vehicle location, and/or any other appropriate localization method. The method may also include comparing a reference road profile corresponding to the end portion of the road segment along a vehicle's path of travel to the measured road profile. In some embodiments, a last portion of the measured road profile may be compared to the reference road profile as the vehicle traverses the road segment, where the last portion of the measured road profile and reference road profile have approximately equal (e.g., equal) lengths. The method may include determining a correlation between the measured road profile and the reference road profile, for example, using a cross-correlation function or another appropriate function that assesses similarity between the measured road profile and the reference road profile (e.g., dynamic time warping, etc.). The method may also include determining if the correlation between the measured road profile and the reference road profile exceeds a threshold correlation. The threshold correlation may be predetermined based at least in part on a road type, as will be discussed in detail further below. If the correlation exceeds the threshold correlation, the location of the vehicle may be determined, as the position of the vehicle may correspond to the location of the road segment end point. If the correlation does not exceed the threshold correlation, the location of the vehicle may not be determined, and the method may continue with the vehicle advancing down the road and re-determining a correlation between the measured road profile (including additional data measured while advancing down the road) and the reference road profile. In addition to the above, as the vehicle approaches the endpoint of the last portion of the road profile, the correlation between the measured road profile and the reference road profile may increase to a peak at a location corresponding approximately to the endpoint of the reference road profile. Accordingly, in some embodiments, the method may include detecting a peak in the correlation between the measured road profile and the reference road profile while the vehicle moves through an area within a threshold distance of the road segment end point. Additional details of such peak detection are discussed in further detail below.

The various embodiments disclosed herein are related to determining the location of a vehicle on a road surface and/or for creating maps of road segments including information that may be used to locate a vehicle on a road surface. Such information may provide a priori information to a vehicle about one or more road surface features and/or road surface properties located on the road segment along an upcoming portion of the path of travel of the vehicle. As noted previously, by knowing this information prior to the vehicle encountering a given portion of a road segment, operation of one or more systems of a vehicle, e.g., autonomous and/or semi-autonomous systems of the vehicle, may be at least partly controlled based on this information. Accordingly, any of the embodiments disclosed herein may provide information, e.g. vehicle, road surface feature, and/or road parameter locations, that may be used by one or more vehicles to control one or more vehicle systems. Thus, in some embodiments, one or more systems of a vehicle may be controlled based at least in part on a determined location of a vehicle, dead reckoning, a reference profile of a road segment, and combinations of the foregoing. Examples of systems that may be controlled may include suspension systems (semi or fully active), propulsion system, advanced driver assistance systems (ADAS), electric power steering (EPS), antilock braking systems (ABS), navigation systems of autonomous vehicles, and/or any other appropriate type of vehicle system.

According to exemplary embodiments described herein, a vehicle may include one or more wheels and one or more vehicle systems that are controlled by a vehicle control system. A vehicle control system may be operated by one or more processors. The one or more processors may be configured to execute computer readable instructions stored in volatile or non-volatile computer readable memory that when executed perform any of the methods disclosed herein. The one or more processors may communicate with one or more actuators associated with various systems of the vehicle (e.g., braking system, active or semi-active suspension system, driver assistance system, etc.) to control activation, movement, or other operating parameter of the various systems of the vehicle. The one or more processors may receive information from one or more sensors that provide feedback regarding the various portions of the vehicle. For example, the one or more processors may receive location information regarding the vehicle from a Global Navigation Satellite System (GNSS) such as a global positioning system or other positioning system. The sensors on board the vehicle may include, but are not limited to, wheel rotation speed sensors, inertial measurement units (IMUs), optical sensors (e.g., cameras, LIDAR), radar, suspension position sensors, gyroscopes, etc. In this manner, the vehicle control system may implement proportional control, integral control, derivative control, a combination thereof (e.g., PID control), or other control strategies of various systems of the vehicle. Other feedback or feedforward control schemes are also contemplated, and the present disclosure is not limited in this regard. Any suitable sensors in any desirable quantities may be employed to provide feedback information to the one or more processors. It should be noted that while exemplary embodiments described herein may be described with reference to a single processor, any suitable number of processors may be employed as a part of a vehicle, as the present disclosure is not so limited.

According to exemplary embodiments described herein, one or more processors of a vehicle may also communicate with other controllers, computers, and/or processors on a local area network, wide area network, or internet using an appropriate wireless or wired communication protocol. For example, one or more processors of a vehicle may communicate wirelessly using any suitable protocol, including, but not limited to, WiFi, GSM, GPRS, EDGE, HSPA, CDMA, and UMTS. Of course, any suitable communication protocol may be employed, as the present disclosure is not so limited. For example, the one or more processors may communicate with one or more servers from which the one or more processors may access road segment information. In some embodiments, one or more servers may include one more server processors configured to communicate in two-way communication with one or more vehicles. The one or more servers may be configured to receive road profile information from the one or more vehicles, and store and/or utilize that road profile information to form road segment information. The one or more servers may also be configured to send reference road profile information to one or more vehicles, such that a vehicle may employ terrain-based localization according to exemplary embodiments described herein, and one or more vehicle systems may be controlled or one or more parameters of the one and/or more vehicle systems may be adjusted based on forward looking road profile information.

In the various embodiments described herein, in some instances, a method of terrain-based localization may be based on peak detection of a cross-correlation between a reference road profile and a measured road profile as a vehicle passes through a road segment end point. In some embodiments, a measured road profile of a predetermined length approximately equivalent to that of the reference road profile may be cross correlated to the reference road profile once the vehicle enters a threshold range of the road segment end point to obtain a correlation between 0 and 1. In some embodiments, the threshold range of the road segment end point may be less than 15 m, 10 m, 5 m, and/or any other appropriate range. In some embodiments, the threshold range of the road segment end point may be based at least partly on a resolution of a GNSS onboard the vehicle. In such embodiments, the threshold range may be approximately equal (e.g., equal) to the resolution of the GNSS.

According to exemplary embodiments described herein, once a vehicle enters the threshold range of the road segment end point, a cross correlation between the measured road profile and reference road profile may be performed and the correlation determined. If the correlation does not exceed a threshold correlation, the vehicle location may not be determined, and the process of terrain-based localization may continue with the vehicle continuing to move down the road. While the vehicle is within the threshold range of the road segment end point, a correlation may be re-determined effectively continuously (e.g., at each time step) as the measured road profile includes the most recent data from the vehicle and removes the oldest data falling outside of the predetermined length. Each time a correlation is determined, it may be determined if the correlation exceeds the threshold correlation. Once the correlation exceeds the threshold correlation at a given time step, it may be determined that the vehicle was located at the road segment end point at that time step. In some embodiments, a peak detection algorithm may be applied to determine if the correlation between the measured road profile and reference road profile is a maximum correlation. In some such embodiments, a slope of the correlation may be determined between the most recent time step and earlier time steps. In some embodiments, a peak may be determined where the slope is negative, and the correlation is decreasing after the correlation exceeded the threshold correlation. Of course, any suitable peak detection function may be applied, as the present disclosure is not so limited. In some embodiments, a threshold correlation may be greater than or equal to 0.6, 0.7, 0.8, 0.9, and/or any other appropriate value. In some embodiments, the threshold correlation may be based at least party on the type of road segment. For example, a highway or high-speed road may have a greater threshold correlation than a low-speed road where more variations in a path taken by a vehicle may be present. According to this example, in some embodiments, a threshold correlation for a highway may be greater than or equal to 0.8, and a threshold correlation for a non-highway road may be greater than or equal to 0.5.

According to exemplary embodiments described herein, road segment information may be stored in one or more databases onboard a vehicle and/or in one or more remotely located servers. In some embodiments, a database may be contained in non-transitory computer readable memory. In certain embodiments, the database may be stored in memory that is exclusively or partially located remotely (e.g., "in the cloud") from the vehicle, and the database and the vehicle may exchange information via a wireless network (e.g., a cellular network (e.g., 5G, 4G), WiFi, etc.). Alternatively, in some embodiments, the database may be stored in non-transitory memory that is located on the vehicle. In certain embodiments. Road segments may be specific for a direction of travel, such that for "two-way" roads (i.e., roads which support simultaneous travel in opposing directions), there may be a distinct set of road segments for each direction of travel (e.g., a first set of road segments for travel in a first direction and a second set of distinct road segments for travel in a second direction).

As used herein, road profile refers to any appropriate description or characterization of a road surface as a function of distance. For example, a road profile may refer to a road height profile that describes variations of height of a road's surface as a function of distance along a given road segment. Alternatively or additionally, a road profile may refer to mathematically related descriptions of road surface. For example, a road profile may refer to a "road slope" profile that describes road slope as a function of distance along a road segment. A road profile of a road segment may be obtained, for example, by measuring—as a vehicle traverses the road segment—vertical motion (e.g., acceleration data, velocity data, position data) of a portion of the vehicle (e.g., to the vehicle's wheel, wheel assembly, or other part of the unsprung mass; or a portion of the vehicle's sprung mass), and optionally processing this data (e.g., transforming it from time to distance domains based on operating speed, integrating the data with respect to time, filtering it (e.g., to remove wheel hop effects), etc.). For example, if vertical acceleration of a wheel is measured using an accelerometer attached to the wheel, then vertical velocity of the wheel may be obtained through integration, and vertical height obtained through further integration. With knowledge of the operating speed of the vehicle (that is, the speed at which the vehicle traverses the road segment), vertical height with respect to distance travelled may be obtained. In some embodiments, further filtering may be advantageous. In one example, a road height profile may be obtained from the wheel's vertical height data (e.g., as determined by measuring acceleration of the wheel) by applying a notch filter or low-pass filter (to, e.g., measured vertical acceleration of the wheel) to remove effects of wheel hop. A road profile may incorporate information describing or characterizing discrete road surface anomalies such as, for example, potholes (or other "negative" events) and/or bumps (or other "positive" events). Additionally or alternatively, a road profile may incorporate information about distributed road surface characteristics such as road roughness and/or road surface friction.

According to exemplary embodiments described herein, if a vehicle travels on a road (or section of a road) for which no reference road profile data exists, reference data (including, e.g., a reference road profile, characterization of the road's surface, and/or the presence of irregular events such as bumps or portholes) may be generated by collecting motion data from one or more motion sensors (e.g., accelerometers, position sensors, etc.) attached to one or more points of the vehicle (e.g., attached to a wheel of the vehicle, a wheel assembly of the vehicle, a damper, another part of the unsprung mass of the vehicle, or a part of the sprung mass of the vehicle). Data collected from a first traversal of the road or road section may then be used to generate the reference data that may be stored in a database and associated with the particular road segment of the road or road section. Alternatively, data may be collected from a plurality of vehicle traversals and merged (e.g., averaged using a mean, mode, and/or median of the reference data) together to generate reference data.

According to exemplary embodiments described herein, the location of a vehicle may be estimated or at least partially determined by, for example, absolute localization systems such as satellite-based systems. Such systems may be used to provide, for example, absolute geocoordinates (i.e., geographic coordinates on the surface of the earth such as longitude, latitude, and/or altitude) of a vehicle. Satellite based systems, generally referred to as a Global Navigation Satellite System (GNSS), may include a satellite constellation that provides positioning, navigation, and timing (PNT) services on a global or regional basis. While the US based GPS is the most prevalent GNSS, other nations are fielding, or have fielded, their own systems to provide complementary or independent PNT capability. These include, for example: BeiDou/BDS (China), Galileo (Europe), GLONASS (Russia), IRNSS/NavIC (India) and QZSS (Japan). Systems and methods according to exemplary embodiments described herein may employ any suitable GNSS, as the present disclosure is not so limited.

According to exemplary embodiments described herein, dead reckoning may either be used to determine a location of the vehicle at a time point after the vehicle's last known location using the vehicle's measured path of travel and/or displacement from the known location. For example, the distance and direction of travel may be used to determine a path of travel from the known location of the vehicle to determine a current location of the vehicle. Appropriate inputs that may be used to determine a change in location of the vehicle after the last known location of the vehicle may include, but are not limited to, inertial measurement units (IMUs), accelerometers, sensor on steering systems, wheel angle sensors, relative offsets in measured GNSS locations between different time points, and/or any other appropriate sensors and/or inputs that may be used to determine the relative movement of a vehicle on the road surface relative to a previous known location of the vehicle. This general description of dead reckoning may be used with any of the embodiments described herein to determine a location of the vehicle for use with the methods and/or systems disclosed herein.

In some cases, roads may include more than one track (e.g., lane) for each direction of travel, and the road profile may differ for each track. It may not be known in a reference database how many tracks (e.g., lanes) are in a road or road segment, which may lead to difficulties when generating reference data for the road or road section. For example, if a reference road profile for a given road is generated by a vehicle travelling in the left-most lane of a multi-lane road, subsequent attempts to use said reference road profile to localize a vehicle travelling in the right-most lane may fail due to differences in road surface between the left-most lane and the right-most lane. Thus, knowing both how many tracks a road has, and in which track a vehicle is travelling, is desirable for both generating reference road profiles, subsequent localization, and for using the information for controlling a vehicle and/or one or more vehicle systems. Prior attempts at determining a track of a road profile have raised computational challenges, such as data storage for road profiles of multi-lane use (e.g., a lane change) which are not useful for the majority of vehicle traversals of a road segment which occur in a single lane.

In view of the above, the inventors have recognized the benefits of a road segment organizational structure in which multiple road surface profiles may be associated with a single road segment. The road segment structure allows multiple road profiles to be associated with a road segment in a manner that is less data and computationally intensive. Additionally, the inventors have recognized the benefits of a road segment organizational structure which employs a threshold-based approach to collecting and storing road profiles that may be associated with a road track. In particular, the inventors have appreciated that until a sufficiently large number of stored road profiles is reached, clustering and/or merging road profiles may result in inaccurate road profile information.

In some embodiments, a method of identifying a track (e.g., a lane) of a road profile for a road segment includes measuring a road profile of the road segment with any appropriate onboard sensor as disclosed herein as the vehicle traverses the road segment (e.g., employing a vehicle according to exemplary embodiments described herein). A measured road profile may be transmitted to a server each time a vehicle traverses the road segment, such that a plurality of vehicles may transmit a plurality of measured road profiles to the server. The method may also include determining if the number of stored road profiles exceeds a threshold number of road profiles. The threshold number of road profiles may be predetermined to allow a sufficient number of road profiles to be collected prior to data manipulation. In some cases, the threshold number of road profiles may be based on the type of road segment. For example, a high-speed road such as a highway may have a greater threshold number of road profiles as highways typically include more lanes than low speed roads. In some embodiments, the threshold number of road profiles may be between 2 and 64 road profiles, between 8 and 12 road profiles, and/or any other suitable number. If the server receives a road profile from the vehicle and the threshold number of stored road profiles is not exceeded, the received measured road profile may be stored and associated with the road segment. However, if the threshold number of road profiles is exceeded by the received measured road profile, the method may include identifying the most similar two road profiles of the measured road profile and stored road profiles. The most similar two road profiles may be identified based on a cross-correlation function performed on each pair of road profiles, and comparing the resulting degree of similarity values. If the degree of similarity of the two most similar road profiles exceeds a predetermined similarity threshold, the two most similar road profiles may be merged into a merged road profile. If the degree of similarity of the two most similar profiles does not exceed a similarity threshold, the oldest road profile may be discarded, and the newly measured road profile stored. In this manner, similar road profiles may be retained by the server, whereas outlying road profiles will be eventually removed. As similar road profiles are merged, information regarding how many road profiles have been merged into a single merged profile may be kept as metadata, with greater numbers of road profiles in a single merged profile representing a track (e.g., lane) of a road segment.

In some embodiments, a degree of similarity may be a value between 0 and 1 which is the output of a cross-correlation function. In some embodiments, a similarity threshold for merging road profiles may be greater than or equal to 0.6, 0.7, 0.8, 0.9, and/or any other appropriate value. In some embodiments, the similarity threshold may be based at least party on the type of road segment. For example, a highway or high-speed road may have a greater threshold correlation than a low-speed road where more variations in a path taken by a vehicle may be present. According to this example, in some embodiments, a threshold correlation for a highway may be greater than or equal to 0.8, and threshold correlation for a non-highway road may be greater than or equal to 0.5.

In some embodiments, if a set of road profiles includes a sufficiently large number of road profiles (e.g., exceeding a threshold number of road profiles), a correlation clustering algorithm is conducted on the set of road profiles. A number of appropriate correlation clustering algorithms are known in the art, including, for example, hierarchal or partitional clustering methods (e.g., k-means clustering, c-means clustering, principal component analysis, hierarchal agglomerative clustering, divisive clustering, Bayesian clustering, spectral clustering, density-based clustering, etc.) Subsequent to a correlation clustering process, the set of road profiles may be divided into one or more clusters, where each road profile contained within a given cluster is substantially similar to each other road profile contained within the given cluster. For example, the set of road profiles in a road segment may be divided into at least a first cluster of road profiles and a second cluster of road profiles, where each road profile in the first cluster is substantially similar to each other road profile in the first cluster, and each road profile in the second cluster is substantially similar to each other road profile in the second cluster. In some embodiments, a similarity of the plurality of road profiles in each cluster may be more similar to other road profiles in the same road profile as compared to road profiles in other clusters as determined using any appropriate comparison method including, for example, a cross correlation function as described herein. In certain embodiments, each cluster may be considered as corresponding to a track (e.g., a lane) of the road, road segment, or road segment. In certain embodiments, all of the road profiles within a given cluster may be merged (e.g., averaged), in order to obtain a single track-merged road profile. This merged road profile may serve as the reference road profile for a given track within a road segment (e.g., for future terrain-based localization or future preview control of vehicles (e.g., controlling one or more vehicular systems based on knowledge of upcoming road characteristics)), and may be stored in the database and associated with a specific track in a road segment. This merging may be carried out for each identified cluster. In certain embodiments, the clustering algorithm may be periodically repeated (e.g., after a certain number of new road profiles are collected for a given road segment), Alternatively, the clustering algorithm may be repeated after each new road profile is collected to determine which cluster the new profile belongs in.

In some embodiments, rather than considering each cluster to correspond to a track, only clusters having a number of road profiles that exceed a threshold number of road profiles are considered to correspond to tracks. A track represents a path that vehicles take when traversing a road segment. For example, a cluster with a single road profile or a small number of profiles less than the threshold number of road profiles, may be considered an outlier, rather than a separate track. Outliers may occur, for example, when a vehicle experiences an atypical event while traversing a road segment (e.g., the vehicle may change lanes within a road segment, or may traverse some temporary debris or garbage on the road that is not typically present). In certain embodiments, road profiles considered outliers may be deleted after some amount of time in order to save space, not cause confusion, or other appropriate reasons.

According to exemplary embodiments described herein, one or more road profiles may be merged into a merged road profile. In some embodiments, merging two or more road profiles may include averaging the two or more profiles. In some embodiments, merging the two or more road profiles may include accounting for the range of frequencies over which the information provided in a measured road profile is valid. In some instances, two or more measured road profiles may have overlapping, but not identical, valid frequency ranges. In such instances, the overlapping portions may be averaged while the non-overlapping portions may be left unchanged. A reference profile created from multiple overlapping, but not identical, measured road profiles may have a wider valid frequency range than an individual measured road profile. According to such an embodiment, sensors of varying quality and frequency may be merged into a merged profile without distorting the merged road profile, as the most useable data from each measure profile may be combined. Of course, any suitable technique for merging two or more road profiles may be employed, as the present disclosure is not so limited.

In some embodiments, tracks of consecutive road segments may be linked in the database. These links may form a directed graph showing how tracks on consecutive road segments are visited. For example, a given road may include a first road segment and a second road segment, where the first road segment and second road segment are consecutive. If it is determined that the first road segment contains two tracks (which, in some embodiments, may correspond to physical lanes on a roadway) and the second road segment contains two tracks, each track of the first road segment may be linked in the database to a respective track in the second road segment. This "track linking" may be carried out based on historical trends—for example, if it is observed that a majority of vehicles, or other appropriate threshold, travel from one track (i.e. first road profile) in a first road segment to a corresponding track (i.e. second road profile) in the second road segment those tracks may be linked together in a database containing the road profiles of the various road segments. For example if vehicles preferably travel from "track 1" in the first road segment to "track 1" in the second road segment, then track 1 of the first road segment may be linked to track 1 in the second road segment. These linkages may be used to predict travel, such that if a vehicle at a given time is localized to "track 1" in the first road segment, it may be assumed that the vehicle is likely to continue to "track 1" in the second road segment. Accordingly, a vehicle may use a track identification to prepare and/or control one or more vehicle systems for an upcoming road profile.

In some embodiments, a road profile may include additional information regarding the vehicle traversal to assist with clustering and/or lane identification according to exemplary embodiments described herein. For example, in some embodiments, a road profile may include an average speed which may be determined by averaging the speeds of vehicles traversing the road segment when measuring the various measured profiles used to determine the road profile. According to such an example, the average speed may assist in lane identification and clustering, as lanes may differ in average speed. For example, in the U.S. a right-most lane may have the lowest average speed whereas the left-most land has the highest average speed. Accordingly, a first track with a lower average speed may be associated with a right-most lane and a second track with a higher average speed may be associated with a left-most lane of a roadway. Of course, any suitable information may be collected and employed to identify a vehicle lane of a road segment, as the present disclosure is not so limited.

As used herein, the term "location" may refer a location of a vehicle expressed in absolute coordinates, or it may refer to a position of a vehicle along a road. A position of a vehicle may be expressed as a distance relative to some feature of a road (e.g., as a distance relative to the start of a road, relative to some intersection, relative to some feature located on the road, etc.).

It should be understood that while specific types of sensors for measuring a road profile are described in the embodiments below, any appropriate type of sensor capable of measuring height variations in the road surface, or other parameters related to height variations of the road surface (e.g., accelerations of one or more portions of a vehicle as it traverses a road surface) may be used as the disclosure is not so limited. For example, inertial measurement units (IMUs), accelerometers, optical sensors (e.g., cameras, LIDAR), radar, suspension position sensors, gyroscopes, and/or any other appropriate type of sensor may be used in the various embodiments disclosed herein to measure a road surface profile of a road segment a vehicle is traversing as the disclosure is not limited in this fashion.

As used herein, an average may refer to any appropriate type of average used with any of the parameters, road profiles, or other characteristics associated with the various embodiments described herein. This may include averages such as a mean, mode, and/or median. However, it should be understood that any appropriate combination of normalization, smoothing, filtering, interpolation, and/or any other appropriate type of data manipulation may be applied to the data to be averaged prior to averaging as the disclosure is not limited in this fashion.

As used herein, a road profile may correspond to a "track" or a "lane", and in some instances these terms may be used interchangeably. As used herein, a "track" may be a path that one or more vehicles take to traverse a road segment. In some embodiments, "clusters" correspond to "tracks" and/or "lanes". In some embodiments, "tracks" correspond to physical "lanes" on a road. In other embodiments, "tracks" do not correspond to physical "lanes" on a road.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts an embodiment of a road map including a road 100 divided into a set of road segments. As shown in FIG. 1, the road map includes the road 100 and cross-roads 101 which intersect with the road 100 at one or more locations along the length of the road. For the sake of simplicity, the intersecting roads are not shown as divided into road segments. Additionally, for illustration a plurality of buildings 10 are shown on the road map. As shown in FIG. 1, a vehicle 150 is traveling on the road 100. The road 100 is broken into six road segments in the embodiment of FIG. 1: a first road segment 102, a second road segment 104, a third road segment 106, a fourth road segment 108, a fifth road segment 110, and a sixth road segment 112. In this illustrative example, each road segment 102, 104, 106, 108, 110, 112 has a common length "L", and is associated at least with a start point and an end point, though segments with unequal lengths may also be used. The start and end points shown in FIG. 1 are illustrated as dashed lines, though in some embodiments the start and end points may be single points defined by geographical coordinates. In some embodiments, as shown in FIG. 1, the start point of a given road segment may coincide with the end point of a previous abutting road segment. In some embodiments, the length of each road segment is between 60 m and 100 m, though the disclosure is not so limited and road segments of other lengths may be used as discussed herein. Exemplarily methods employing the road segments of FIG. 1 will be discussed further with reference to FIGS. 4-6.

Figure 2:
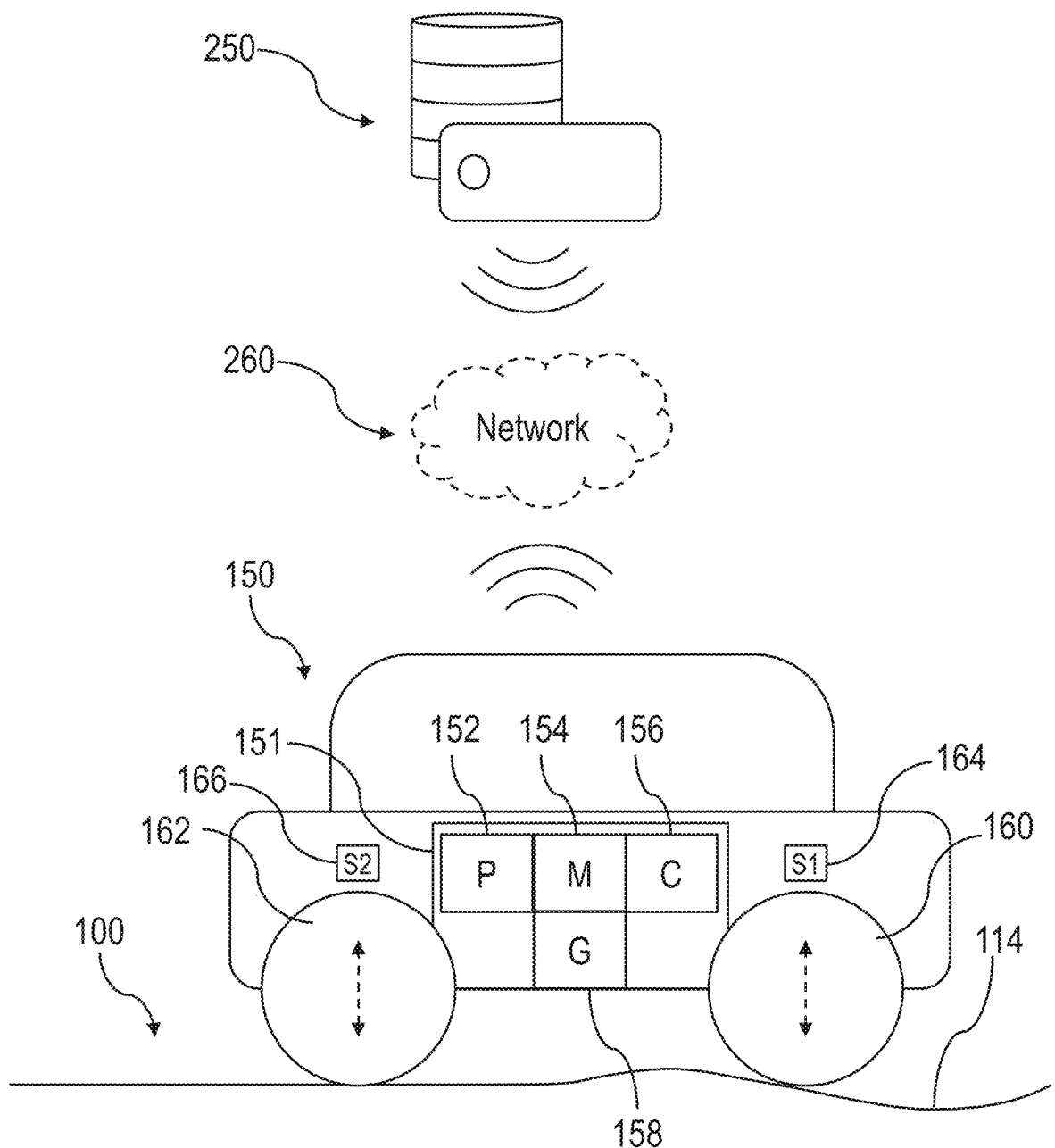
FIG. 2 depicts a schematic of an embodiment of a vehicle.

FIG. 2 depicts a schematic of an embodiment of a vehicle 150. The vehicle 150 may be employed in various methods according to exemplary embodiments described herein. As shown in FIG. 2, the vehicle includes a vehicle control system 151 which is configured to control one or more systems of the vehicle. In some embodiments as shown in FIG. 2, the vehicle control system includes one or more processors 152, non-transitory computer readable memory 154 associated with the one or more processors, and a communications module 156. The processor may be configured to execute computer readable instructions stored in the non-transitory computer readable memory to perform various methods described herein, and to control various systems of the vehicle. The communications module 156 may be a wireless communications module configured to allow the vehicle control system to communicate with remote devices (e.g., other vehicles, a server, the internet, etc.). The communications module 156 may employ any suitable wireless communication protocol. In some embodiments, the communications module 156 may be configured for two-way communication with a remote device such that the communications module may send and/or receive information. According to some embodiments as shown in FIG. 2, the vehicle 150 may include a Global Navigation Satellite System receiver (GNSS receiver) 158 which may be employed to estimate a location of the vehicle, which may in turn be used to localize the vehicle using terrain-based localization methods implemented by a train-based localization system as described herein. According to the embodiment of FIG. 2, the vehicle 150 includes wheels 160, 162 which traverse a road 100 having road features 114. The vehicle 150 includes one or more sensors associated with various portions of the vehicle, such as the depicted first sensor 164 and second sensor 166 configured to measure displacement of the wheels to measure the road profile of the road 100. For example, the first sensor 164 and second sensor 166 may be accelerometers configured to measure movement of the wheels. However, different types of sensors associated with different portions of the vehicle may be used to measure a road profile as previously described. Regardless of the specific sensor(s) used, the measured information from the sensor(s) may be transmitted to the processors 152, which may aggregate the sensor signals to form a measured road profile.

According to the embodiment of FIG. 2, the vehicle 150 is configured to communicate with one or more remote servers, other vehicles, and/or any other appropriate system via communications module 156. In some embodiments as shown in FIG. 2, the communications module 156 may communicate via a network 260 (e.g., a local area network, wide area network, internet, etc.) to a server 250. The communications module may send information (e.g., measured road profile information) to the server 250, and the communications module may receive information (e.g., reference road profile information, road segment information) from the server. The organizational structure of road segment information received from the server 250 is discussed further with reference to FIG. 3. While in the embodiment of FIG. 2 the vehicle is communicating with a single server, a vehicle may communication with any number of servers or other remote devices, as the present disclosure is not so limited. In some embodiments, the server may include a database of road segment information for a road network.

FIG. 3 depicts an exemplary embodiment of a road segment data structure 200. In some embodiments, a database may store information about a plurality of road segments (e.g., slices) of a given road. FIG. 3 illustrates such an exemplary database that contains information about the road segments shown in FIG. 1, for example. The exemplary information stored may include any combination of approximate absolute coordinates (e.g., latitude and longitude) of a start point of the road segment, approximate absolute coordinates (e.g., latitude and longitude) of an end point of the road segment, relative position of the start point and/or end point (e.g., a distance relative to the start of a road, or relative to some intersection or other landmark), and characteristics of the road surface within the road segment. Absolute coordinates may be known only within the accuracy or resolution of a first localization system, such as, for example, GPS, while relative position may be known within the accuracy or resolution of a second localization system such as, for example, terrain-based localization. Exemplary characteristics of the road surface within the road segment may include, for example, a presence of one or more, discrete or continuous surface irregularities (e.g., bumps, potholes, frost heaves, manhole covers, patches of broken up pavement, patches of exposed road base, etc.) along with a relative position of the irregularity (for example, a position of 50% may indicate that the bump occurs halfway between a given road segment's start point and end point). In certain embodiments, a road profile may be stored for each road segment.

Figure 4:
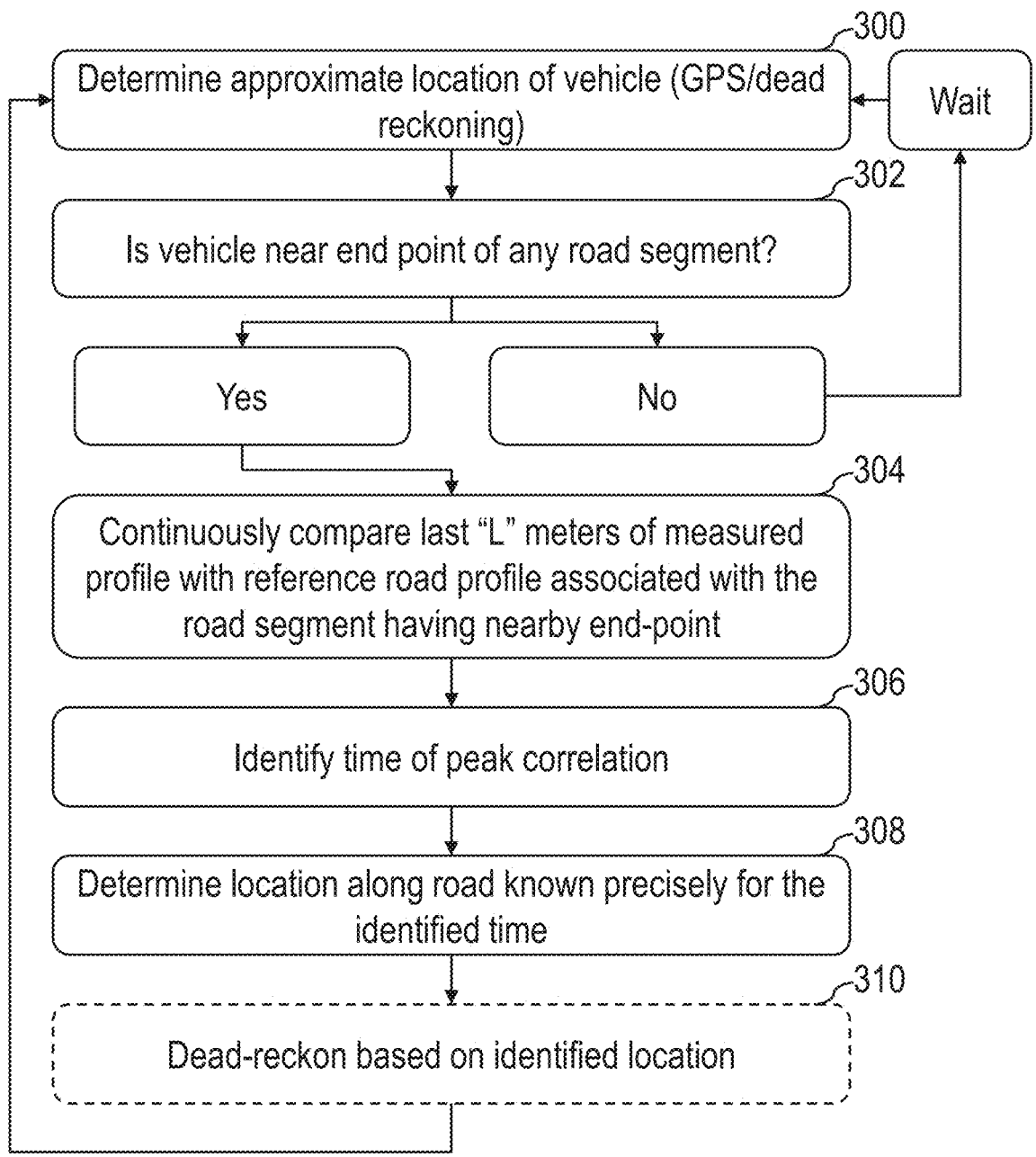
FIG. 4 depicts a flow chart for an embodiment of a method of localizing a vehicle with a terrain-based localization system.

FIG. 4 depicts a flow chart for an embodiment of a method of localizing a vehicle with a terrain-based localization system utilizing a road segment architecture. In some embodiments, as the vehicle travels along a road, a measured road profile may be continually obtained (e.g., using one or more sensors such as accelerometers). Further, the vehicle may be in communication with a database (e.g., on a server) that stores information about a series of road segments. This information may include, e.g., (i) an end point location of each road segment of the series (e.g., as illustrated in FIG. 3), and (ii) at least one reference road profile associated with each road segment.

In block 300 of the illustrative example of FIG. 4, an approximate location of the vehicle may be determined using a first localization system having a first resolution. In certain embodiments, this approximate location may be determined using a vehicle's reported GNSS (e.g., GPS) coordinates, in which case the location is accurate to within resolution of the GNSS employed. Alternatively or additionally, this approximate location may be determined using dead reckoning along with knowledge of a previous position of the vehicle (e.g., using vehicle speed, direction, and/or acceleration integration). In block 302, the vehicle's approximate position may be compared with the relative position of end points of one or more road segments of a road. If it is determined that the vehicle is near an end point of any road segment (e.g., within a threshold distance of the end point), the corresponding road segment (that is, the current road segment on which the vehicle is located) may be selected for comparison. In some embodiments, a vehicle may be considered near an end point of a road segment if the vehicle's approximate location is within a threshold distance of the end point of a road segment. For example, in some embodiments the threshold distance may be within 0.1 L, 0.2 L, 0.4 L, or 0.5 L where "L" is a length of the road segment. Other ranges of threshold distances that are longer or shorter may be utilized, including thresholds provide in terms of absolute lengths as described herein, as the disclosure is not so limited. If it is determined that the vehicle is not near an end point of any road segment, then the system may return to the first step and re-approximate the vehicle's location during a next time step. In some embodiments, a vehicle may re-approximate its position effectively continuously (e.g., each predetermined time step). Alternatively, in some embodiments, the position of the vehicle may be reapproximated following a predetermined interval (e.g., a predetermined time and/or distance interval).

As shown in FIG. 4, in block 304, after a vehicle is determined to be within a predetermined distance, or other threshold, of an end point of the road segment, the process may continuously compare the measured road profile relative to a reference road profile of the road segment associated with the end point. In some embodiments, this comparison (e.g., cross correlated) may be done with the last "L" meters of the measured road profile, where "L" is a length of the road segment as discussed above. In some embodiments, the measured road profile may be continuously compared to the reference road profile while the vehicle is near the road segment endpoint at certain temporal intervals (e.g., once every 0.01 seconds, once every 0.1 seconds, once every 0.2 seconds) and/or distance intervals (e.g., 0.05 L, 0.1 L, 0.2 L, 0.3 L, etc.) Other temporal or distance intervals that are shorter or longer may be employed, as the present disclosure is not so limited. In some embodiments, the comparison between the measured road profile and the reference road profile may be performed using a cross-correlation function, which may output a correlation value. In block 306, the time-point of maximum correlation between the measured road profile and the reference road profile is determined (e.g., using peak detection). In block 308, once the time-point of maximum correlation is determined, it may be assumed that the vehicle is located at the end point of the road segment at that time point. Thus, the precise position of the vehicle along the road at one point in time (e.g., the time-point of maximum correlation) may be determined as it coincides with the end point of the road segment. In optional block 310, further movement of the vehicle after this time point, and prior to the identification of the endpoint of the next road segment, may be tracked using dead reckoning to approximate the position of the vehicle, thus returning the process to block 300 illustrated in FIG. 4. Alternatively, the method may return to block 300 without dead reckoning, as the present disclosure is not so limited. When the vehicle approaches the end point of the subsequent road segment, the method of FIG. 4 may be repeated until the vehicle is precisely located at the end point of the subsequent road segment, and so on as the vehicle traverses any number of road segments. Thus, the vehicle may be precisely located each time it crosses a road segment end point. In some embodiments, distinctive anomalies on a road may alternatively or additionally be used to locate a position of a vehicle along the road.

According to the embodiment of FIG. 4, the method may be performed, in some embodiments, by a processor configured to executed computer-readable instructions stored in non-transitory memory. For example, the method of FIG. 4 may be stored as a series of instructions in non-transitory computer memory for execution by a processor. In some embodiments, the method of FIG. 4 may be performed by a vehicle processor (e.g., see processor 152 in exemplary FIG. 2).

Figure 5:
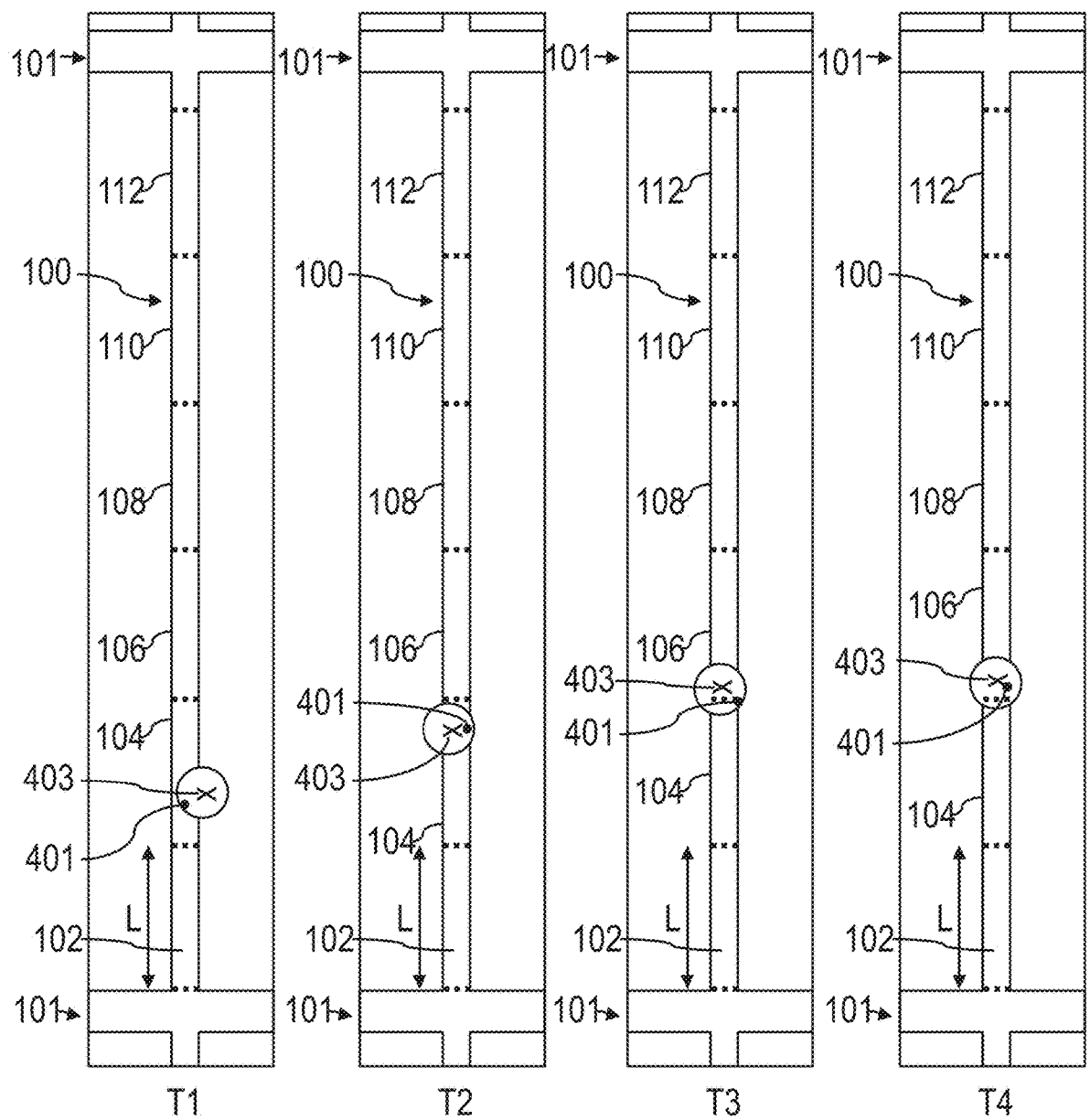
FIG. 5 depicts a process of terrain-based localization of a vehicle according to some exemplary embodiments.

FIG. 5 depicts a process of terrain-based localization of a vehicle according to some exemplary embodiments as a vehicle travels along a road 100 separated into a plurality of road segments 102, 104, 106, 108, 110, 112. The dots 401 in each illustration represent the true location of the vehicle, which is generally unknown but shown for clarity. The "X" 403 in each illustration represents the location of the vehicle as approximated by a first localization system (e.g., by GNSS, dead reckoning, or other location approximation system), while the circle around the X represents the potential range of actual locations based on the reported approximate location and the resolution of the first localization system. In some embodiments, the circle may also be representative of a threshold range from a road segment end point to trigger comparison of a measured road profile and a reference road segment road profile. As shown in FIG. 5, the approximate location may differ somewhat from the true location due to resolution limitations of GNSS or other systems. Note that, while the "X" is used here to represent the location approximated by GNSS, it could also represent a location approximated by dead reckoning or other localization method or system.

As shown in FIG. 5, at a first point in time, denoted T1, in an exemplary embodiment, the location of the vehicle is approximated as being within a second road segment 104, but not near the end point (represented as a dashed line) of the second road segment 104. Thus, the second road segment 104 may not be activated for comparison with a measured road profile observed by the vehicle as it traverses the road 100. Rather, the location of the vehicle may be continually and/or periodically approximated (e.g., by GNSS localization and/or dead reckoning). As shown in FIG. 5, at a second, later point in time T2, the approximate location of the vehicle (e.g., as reported by using a GNSS receiver) may be determined to be near the end point of the second road segment 104, and the second road segment may become activated for comparison. Starting at time T2 (when the second road segment is first activated), the previous L meters of the measured road profile may be compared (e.g., continuously or repeatedly) with the reference road profile associated with the second road segment. That is, the measured road profile may be continually updated as the vehicle moves down the road, and the portion of the measured road profile compared to the reference road profile may be updated as the vehicle traverses the road. For example, in some embodiments, a first portion of a measured road profile may be compared to the reference road profile at T2, where the first portion has a length equivalent to the reference road profile of the second road segment 104. According to such an embodiment, a second portion of a measured road profile may be compared to the reference road profile at a subsequent time step (e.g., at T3), where the second portion has a length equivalent to the reference road profile of the second road segment 104 but has more recent road profile information than the first portion.

When the actual location of the vehicle exactly coincides with the end point of the second road segment 104 (illustrated as time T3 in FIG. 5), the correlation between the previous L meters of the measured road profile and the reference road profile associated with road segment reaches a maximum. Thus, by determining the time of maximum correlation, or the correlation exceeding a threshold, at T3 (e.g., by peak detection and/or a correlation threshold), the location of the vehicle along the road 100 may be precisely determined (at least, within a resolution better than that of the first localization system) as coinciding with the end point of the second road segment 104 at that time (e.g., T3). Following precise localization at a given time, dead reckoning, GNSS, or other methods may then be used to track further movement of the vehicle, as shown in T4. This dead-reckoning and/or GNSS localization may continue until the vehicle is approximated as being near the end point of the next road segment (e.g., a third road segment 106), when the process is repeated for the next road segment as the vehicle traverses any number of road segments.

Figure 6:
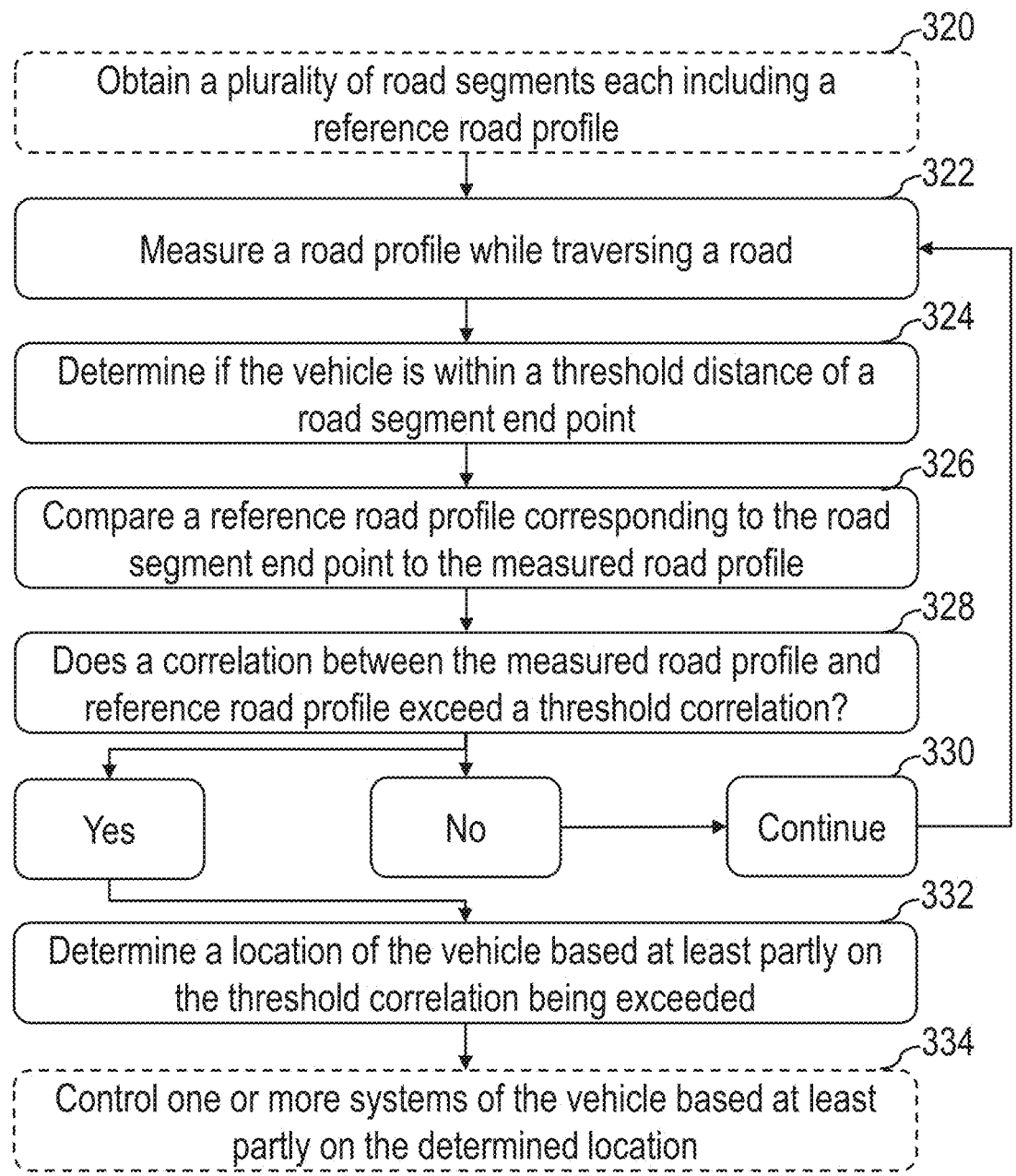
FIG. 6 depicts a flow chart for another embodiment of a method of localizing a vehicle with a terrain-based localization system.

FIG. 6 depicts a flow chart for another embodiment of a method of localizing a vehicle with a terrain-based localization system. In optional block 320, a plurality of road segments may be obtained (e.g., downloaded) where each road segment includes at least one reference road profile. In some embodiments, the road segments may be downloaded from a server via a wireless network. In block 322, a road profile is measured while traversing a road. For example, vertical wheel motion and/or vertical motion of the vehicle may be measured by one or more sensors and the road profile may be based on the input of the one or more sensors. In block 324, it is determined if the vehicle is within a threshold distance of a road segment end point. This determination may be based on an approximated location via GNSS and/or dead reckoning relative to a previously known location of a vehicle along the road segment. In block 326, a reference road profile is compared to the measured road profile. For example, the reference road profile and measured road profile may be cross correlated to determine a correlation of the reference road profile and measured road profile. In block 328, it is determined if a correlation between the measured road profile and the reference road profile exceed a threshold correlation. For example, the correlation (e.g., a number between 0 and 1), may be compared against a predetermined correlation threshold (e.g., greater than or equal to 0.5, 0.6, 0.7, 0.8, or 0.9). If the correlation does not exceed the threshold, the method may continue at block 330 and restart at block 322. If the correlation exceeds the threshold, the location may be at least partly determined based on the threshold correlation being exceeded in block 332. In some embodiments, the method may also include determining if the correlation is a peak correlation before determining that the location of the vehicle corresponds to the time point where the correlation exceeds the threshold correlation. In optional block 334, one or more systems of the vehicle may be controlled based at least partly on the determined location. For example, in some embodiments a suspension system of a vehicle may be controlled based on the determined location. In some embodiments, the one or more systems may be controlled based on a position of the vehicle determined using the determined location and dead reckoning.

According to the embodiment of FIG. 6, the method may be performed, in some embodiments, by a processor configured to executed computer-readable instructions stored in non-transitory memory. For example, the method of FIG. 6 may be stored as a series of instructions in non-transitory computer readable memory for execution by a processor. In some embodiments, the method of FIG. 6 may be performed by a vehicle processor (e.g., see processor 152 in exemplary FIG. 2).

FIG. 7 depicts another exemplary embodiment of a road segment data structure 202. In particular, FIG. 7 depicts a database including road segments (e.g., slices) that may contain track-specific information about each road segment. For example, certain road events (bumps, potholes, etc.) may be associated with only a single track within a road segment. Further, the database may store different reference road profiles for each track of a road segment. As discussed further below, the tracks may be identified by one or more methods, including merging road profiles and/or clustering.

Figure 8:
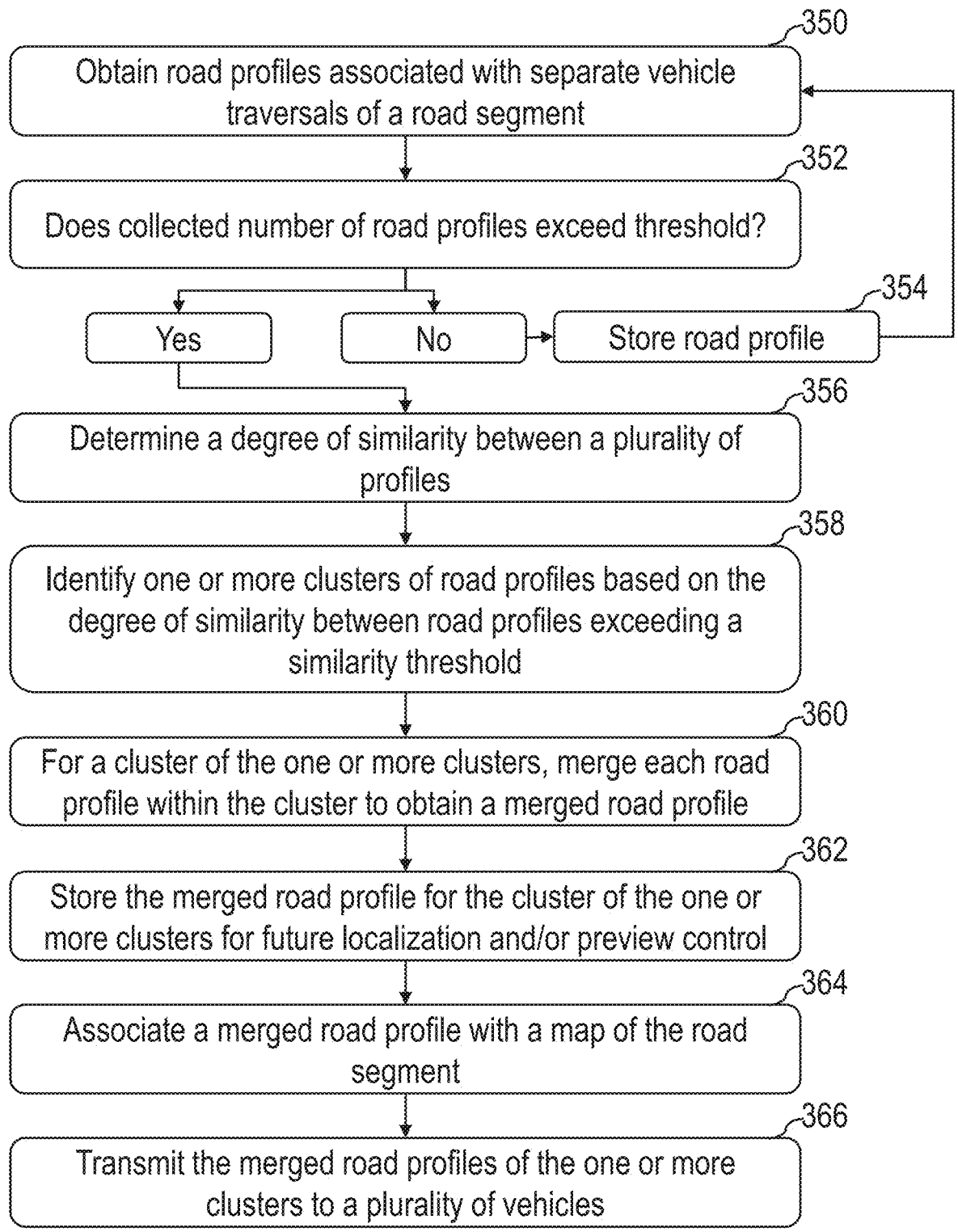
FIG. 8 is a flow chart for one embodiment of a method of collecting a plurality of road segments for terrain-based localization.

FIG. 8 is a flow chart for one embodiment of a method of collecting a plurality of road segments for terrain-based localization. In particular, FIG. 8 illustrates a flow chart of an exemplary method for determining the number of tracks of a road, and for determining a reference road profile for each track. In block 350, a set of road profiles is obtained and stored. In some embodiments, the road profiles may be received from one or more vehicles. Each road profile of the set corresponds to a different traversal of a given road segment. For example, the set of road profiles may correspond to a single vehicle traversing the given road segment multiple times. A distinct road profile may be measured and stored each time the vehicle traverses the road segment. Alternatively, multiple different vehicles may traverse the given road segment, and a distinct road profile may be measured each time any properly equipped vehicle (e.g., a vehicle equipped with hardware and software configured to obtain road profiles and transmit the obtained road profiles, for example as shown in FIG. 2) traverses the road segment, thereby yielding the set of road profiles for a single road segment.

As shown in FIG. 8, in block 352 it is determined if the number of collected road profiles exceeds a threshold number of road profiles. The threshold number of road profiles may be a number of profiles based at least in part on road segment type, storage capacity, and bandwidth capacity. In some embodiments, the threshold number of road profiles may be between 2 and 64, between 8 and 12, and/or any other suitable range. If the collected number of profiles does not exceed the threshold, the road profile is stored in block 354, and the method restarts at block 350. The cycle may continue until the threshold number of road profiles is reached, at which point the method may progress to block 356. In block 356, a degree of similarity between a plurality of road profiles is determined. For example, a cross-correlation function may be applied to each pair of road profiles in a set of road profiles to determine a degree of similarity for each pair of road profiles. In block 358, one or more clusters of road profiles are identified based on the degree of similarity between pairs of road profiles exceeding a similarity threshold. For example, the degree of similarity (e.g., a number between 0 and 1), may be compared against a predetermined similarity threshold (e.g., greater than or equal to 0.5, 0.6, 0.7, 0.8, or 0.9). Of course, any suitable clustering algorithm may be employed to identify one or more clusters of road profiles in a set of road profiles, as the present disclosure is not so limited. In block 360, for a cluster of one or more identified road profiles, each road profile in the cluster may be merged (e.g., averaged) into a merged road profile. In block 362, the merged road profile may be stored for the cluster for future localization and/or road preview control of a vehicle in a non-transitory computer readable memory. In block 364, the merged road profile may be associated with a map of the road segment. For example, the merged road profile may be assigned to a track of the road segment. The resulting map of road profiles and road segments may also be stored in a non-transitory computer readable memory. In either case, in block 366, the merged road profiles may be transmitted (e.g., as a part of a road segment) to a plurality of vehicles to assist in vehicle control.

According to the embodiment of FIG. 8, the method may be performed, in some embodiments, by a processor configured to executed computer-readable instructions stored in non-transitory memory. For example, the method of FIG. 8 may be stored as a series of instructions in non-transitory computer readable memory for execution by a processor. In some embodiments, the method of FIG. 8 may be performed by a server processor (e.g., see server 250 in exemplary FIG. 2).

FIG. 9A depicts an embodiment of a correlation matrix showing the correlation coefficients for each pair of a set of seven road profiles, and FIG. 9B depicts the correlation matrix of FIG. 9A rearranged to show clusters between the seven road profiles. For the purposes of FIGS. 9A-9B, it is assumed that a single vehicle traversed a given road segment seven times, and a new road profile was collected and stored for each traversal. These road profiles are arbitrarily labeled profile 1 to profile 7. Each road profile is subsequently compared with each other road profile (e.g., by cross-correlation) associated with a particular segment of a road, and a degree of similarity metric (e.g., a correlation coefficient) is determined that describes the similarity between each road profile and each other road profile. In various embodiments, any appropriate similarity function (or similarity measure) and resulting similarity metric may be used, and the use of cross-correlation and the resulting correlation coefficients is merely provided as an example. FIGS. 9A-9B illustrates an example of a correlation matrix showing the correlation coefficients for each pair of a set of seven road profiles as compared to each other pair of road profiles. If the similarity metric (e.g., correlation coefficient) for two road profiles exceeds a threshold value, then the road profiles may be considered substantially similar. In some embodiments, this threshold may be greater than 0.5, greater than 0.75, greater than 0.8, greater than 0.9, and/or another appropriate value. For example, in FIG. 9A, a threshold value of 0.8 was chosen such that if the correlation coefficient between two given road profiles exceeds 0.8, these road profiles may be considered sufficiently similar. Sufficiently similar profiles are shown with a bolded outline. It can be seen that profile 1 is substantially similar to profile 3 and profile 4, whereas profile 2 is substantially similar to profile 5 and 7. Profile 6 is not substantially similar to any other collected profile. It is understood that a threshold value of 0.8 is exemplary, and any appropriate threshold value may be selected as discussed previously.

FIG. 9B shows the same information as FIG. 9A, but the columns and rows have been rearranged such that clusters can be more easily identified. From an examination of FIG. 9B, it can be seen that the set of road profiles may be divided into three clusters: a first cluster containing profiles 1, 3, and 4; a second cluster containing profiles 2, 5, and 7; and a third cluster containing only profile 6. As the third cluster contains only a single profile, it may be considered an outlier, in some embodiments. Thus, from the analysis performed in exemplary methods described herein (e.g., FIG. 8), it may be concluded that the given road segment likely contains two tracks: a first track corresponding to the first cluster of profiles and a second track corresponding to the second cluster of profiles. In some embodiments, tracks may correspond to lanes on a roadway. In certain embodiments, each of the road profiles in the first cluster may be merged (e.g., averaged) to give a first merged road profile for the first track. Likewise, each of the road profiles in the second cluster may be merged (e.g., averaged) to give a second merged road profile for the second track. The first and second merged road profiles may be stored in the database, associated with their respective track, and may be used for future localization and/or preview control associated with that road segment. For example, at a future point in time, when a vehicle is localized to the given road segment (e.g., using GPS or dead reckoning) but the track of travel is unknown, a measured road profile obtained from the vehicle may be compared to the first and second average road profiles. Based at least in part on this comparison, a track in which the vehicle is travelling may be determined, which may inform control of one or more vehicle systems.

Figure 10:
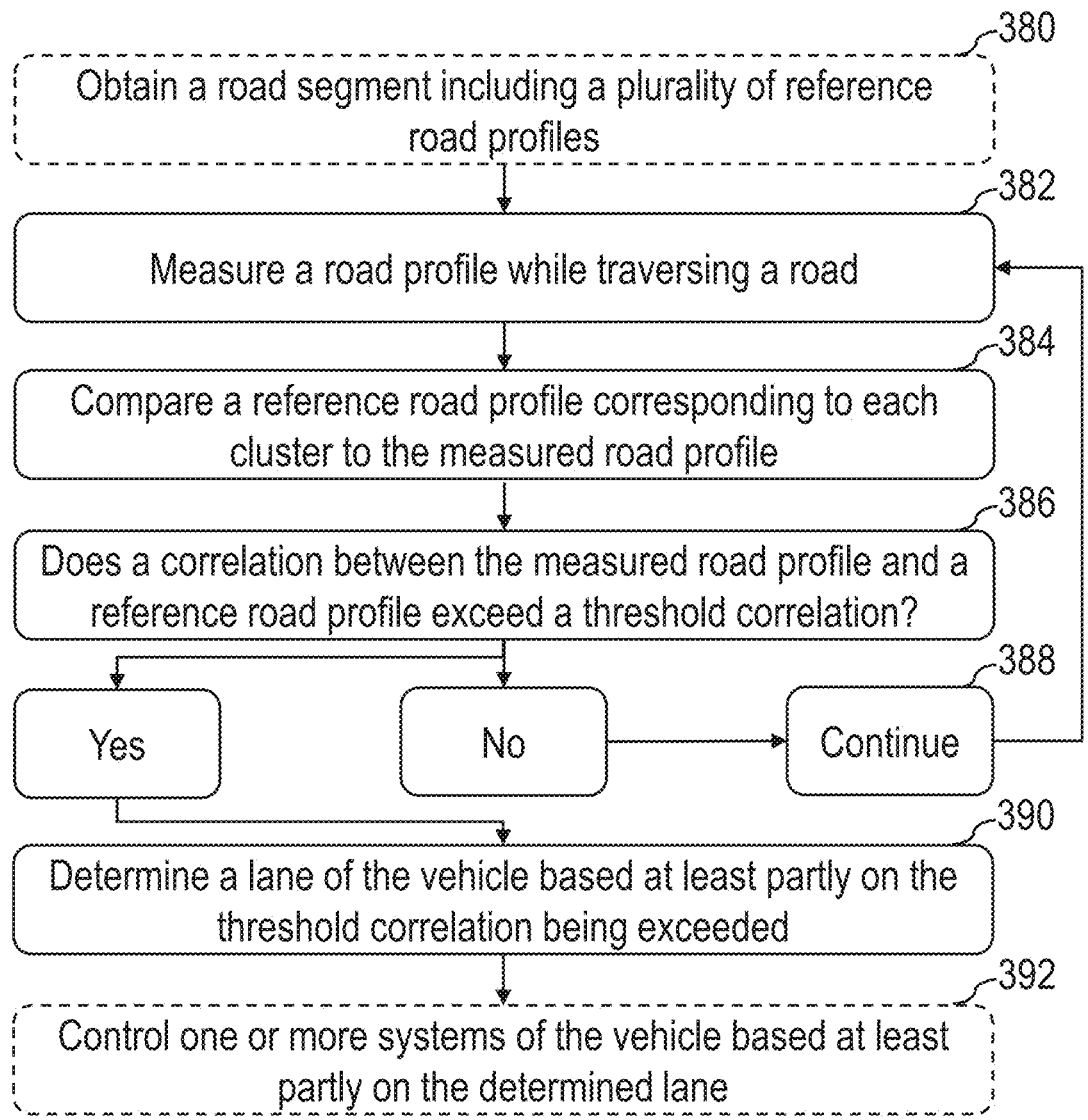
FIG. 10 is a flow chart for another embodiment of a method of localizing a vehicle with a terrain-based localization system.

FIG. 10 is a flow chart for another embodiment of a method of localizing a vehicle with a terrain-based localization system. In particular, the method of FIG. 10 may be employed to localize the vehicle to a specific track of a road segment. In optional block 380, a road segment including a plurality reference road profiles corresponding to different tracks in the road segment is obtained. For example, the road segment may be downloaded from a server to a vehicle. In block 382, a road profile may be measured while the vehicle traverses a road. In block 384, the reference road profile may be compared to each reference road profile of the road segment. In some embodiments, the comparisons of block 384 may be triggered by an approximate location of a vehicle being within a threshold distance of the road segment end point, as described with reference to other exemplary embodiments herein. In some embodiments, the comparisons of block 384 may be a cross-correlation of the measured and reference road profiles. In block 386, it is determined if a correlation between the measured road profile and a reference road profile exceeds a threshold correlation. For example, the correlation (e.g., a number between 0 and 1), may be compared against a predetermined threshold correlation (e.g., greater than or equal to 0.5, 0.6, 0.7, 0.8, or 0.9). If the threshold is not exceeded, the method continues in block 388 at restarts at block 382. If the threshold is exceeded, in block 390 the track of the vehicle may be determined based on the threshold correlation being exceeded between a measured road profile and a reference road profile associated with a particular cluster. In optional block 392, one or more systems of the vehicle may be controlled based at least partly on the determined track of the vehicle.

According to the embodiment of FIG. 10, the method may be performed, in some embodiments, by a processor configured to executed computer-readable instructions stored in non-transitory memory. For example, the method of FIG. 10 may be stored as a series of instructions in non-transitory computer readable memory for execution by a processor. In some embodiments, the method of FIG. 10 may be performed by a vehicle processor (e.g., see processor 152 in exemplary FIG. 2).

Figure 11:
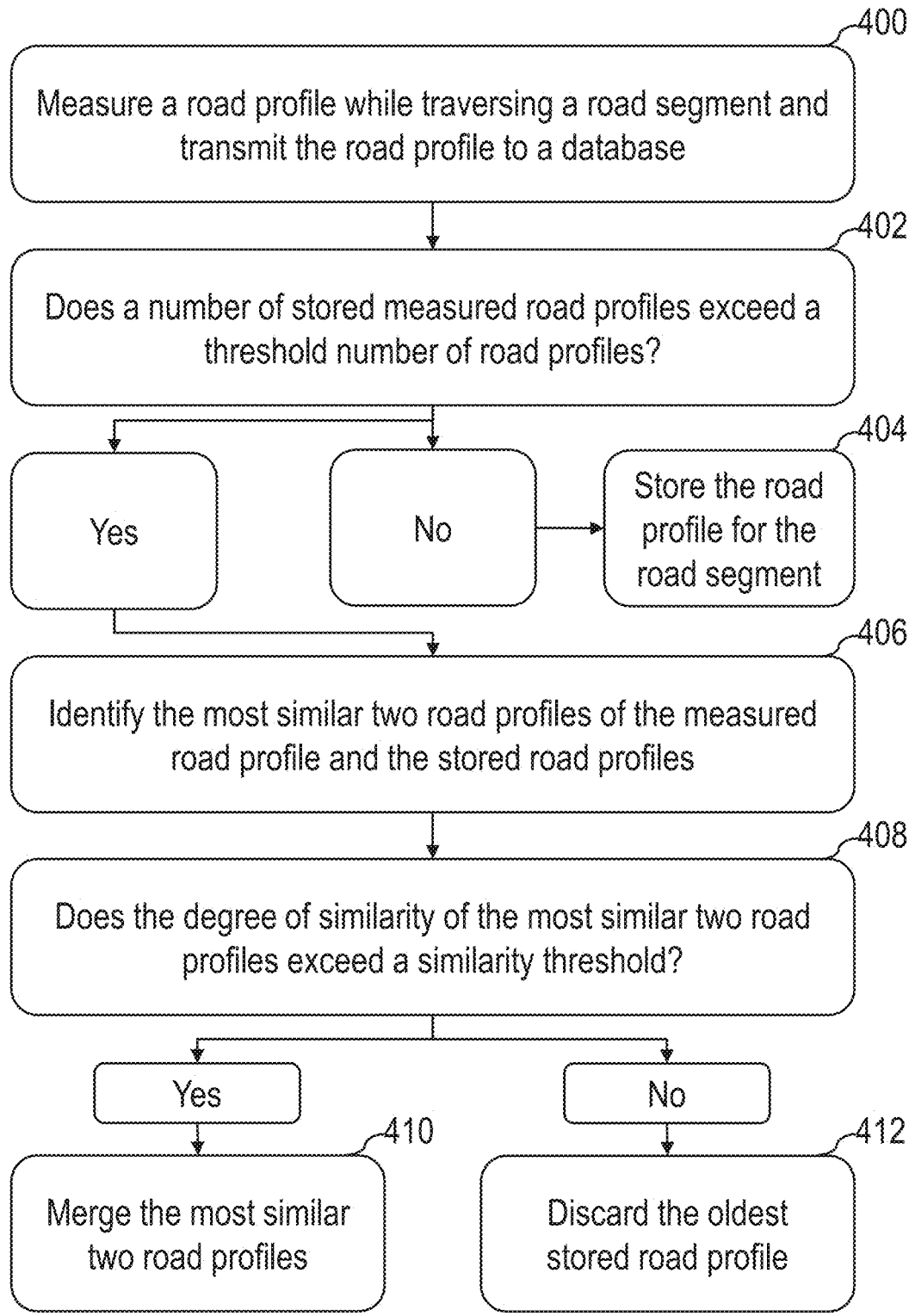
FIG. 11 depicts a flow chart for another embodiment of collecting a plurality of segments for terrain-based localization.

FIG. 11 depicts a flow chart for another embodiment of collecting a plurality of road profiles for a road segment for terrain-based localization. In particular, FIG. 11 depicts a method for defining a road segment with multiple tracks without explicitly running a clustering algorithm to cluster a pre-existing set of road profiles. In block 400, a road profile is measured by traversing a road segment. Alternatively, in some embodiments, the method may include obtaining a measured road profile from a vehicle that transmits the measured road profile to a remote database. In block 402, it is determined if a number of stored road profiles exceeds a threshold number of road profiles (e.g., between 4 and 64 road profiles). If the threshold is not exceeded, the measured road profile may be stored in block 404. If the threshold is exceeded, the method may include identifying the most similar two (or more) road profiles of the measured road profile and stored road profiles in block 406. In some embodiments, the two or more most similar road profiles may be determined by determining a degree of similarity between each of the road profiles and selecting the road profiles with the greatest degree of similarity. The two most similar road profiles may be stored road profiles or may be the measured road profile and a stored road profile. In block 408, it is determined if the degree of similarity of the two (or more) most similar road profiles exceeds a similarity threshold. For example, the degree of similarity, which may be determined using cross correlation, e.g., a number between 0 and 1, may be compared against a predetermined similarity threshold (e.g., greater than or equal to 0.5, 0.6, 0.7, 0.8, or 0.9). If the degree of similarity exceeds the threshold, in block 410 the two (or more) most similar road profiles are merged (e.g., averaged). If the degree of similarity does not exceed the threshold, the oldest stored road profile is discarded in block 412. In some embodiments, the oldest stored road profile may only be discarded if it is not a merged road profile. In such cases, the oldest unmerged road profile may be an outlier. Of course, in some embodiments the oldest merged road profile may be discarded, as the present disclosure is not so limited.

According to the embodiment of FIG. 11, the method may be performed, in some embodiments, by a processor configured to executed computer-readable instructions stored in non-transitory memory. For example, the method of FIG. 11 may be stored as a series of instructions in non-transitory computer readable memory for execution by a processor. In some embodiments, the method of FIG. 11 may be performed by a server processor (e.g., see server 250 in exemplary FIG. 2).

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A method for localizing a vehicle, the method comprising:
   determining, using a terrain-based localization system, a first location of the vehicle at a first point in time;
   traveling a distance after the first point in time; and
   when the distance travelled by the vehicle after the first point in time exceeds a predetermined threshold distance from the first location:
   determining, using the terrain-based localization system, a second location of the vehicle at a second point in time;
   wherein the first location of the vehicle is determined by:
      measuring vertical motion of one or more portions of the vehicle as the vehicle traverses a road;
      based on the measured vertical motion, determining information about the road on which the vehicle is travelling;
      comparing the determined information with reference road surface information; and
      based at least partially on the comparison of the determined information and the reference road surface information, determining the first location of the vehicle, and
      wherein determining the first location of the vehicle comprises determining a time point of correlation above a threshold between the determined information and the reference road surface information.

2. The method of claim 1, wherein the distance travelled by the vehicle since the first point in time is determined at least partially based on dead reckoning and/or global navigation satellite system (GNSS) measurements.

3. The method of claim 1, wherein the reference road surface information includes information about an aspect of the road as a function of position on the road.

4. The method of claim 3, wherein the reference road surface information includes information about variations in a surface of the road as a function of position on the road.

5. The method of claim 1, wherein the reference road surface information includes a road profile.

6. The method of claim 1, wherein the predetermined threshold distance is between 50 meters and 200 meters.

7. A method for localizing a vehicle, the method comprising:
   obtaining an approximate location of the vehicle with a first localization system;
   determining that the approximate location is within a threshold distance of an end point of a first road segment of a series of road segments extending along a length of a road, wherein the first road segment is associated with a first reference road profile; and
   measuring vertical motion of one or more portions of the vehicle as the vehicle traverses the first road segment;
   based on the measured vertical motion, determining information about the road segment on which the vehicle is travelling, the information including at least a measured road profile; and
   with a second localization system more precise than the first localization system, comparing the measured road profile with the first reference road profile when the approximate location of the vehicle is within the threshold distance of the end point and, based on the comparison of the measured road profile with the first reference road profile, determining a first time-point at which the vehicle is located at the end point of the first road segment, thereby localizing the vehicle to the end point of the first road segment at the first time-point;
   wherein determining the first time-point at which the vehicle is located at the end point of the first road segment comprises determining a time point of correlation above a threshold between the measured road profile and the first reference road profile.

8. The method of claim 7, wherein obtaining the approximate location of the vehicle with the first localization system is based at least in part on using a Global Navigation Satellite System (GNSS).

9. The method of claim 7, wherein obtaining the approximate location of the vehicle with the first localization system is based at least in part on using dead reckoning.

10. The method of claim 7, further comprising obtaining for each road segment:
    an end point location of the respective road segment; and
    a reference road profile of the respective road segment.

11. The method of claim 7, further comprising using dead-reckoning to track further movement of the vehicle after the first time-point.

12. The method of claim 7, further comprising generating the measured road profile.

13. The method of claim 12, wherein generating the measured road profile comprises measuring vertical motion of one or more portions of the vehicle as the vehicle operates.

14. The method of claim 13, wherein generating the measured road profile further comprises filtering the measured vertical motion to remove effects of wheel-hop.

15. The method of claim 13, wherein generating the measured road profile further comprises differentiating the measured vertical motion with respect to time or distance.

16. The method of claim 13, wherein generating the measured road profile further comprises transforming the measured vertical motion from a time domain to a distance domain.

17. The method of claim 7, wherein the comparison of the measured road profile with the first reference road profile is carried out in response to the determination that the approximate location is within a threshold distance of the end point of the first road segment.

18. The method of claim 7, further comprising:
    estimating a distance travelled by the vehicle since the first time-point; and
    upon determining that the distance travelled by the vehicle since the first time-point exceeds a predetermined distance:
       comparing a second measured road profile with a second reference road profile, wherein the second reference road profile is associated with a second road segment that is geographically consecutive to the first road segment; and
       based on the comparison between the second measured road profile and the second reference road profile, determining a second time-point at which the vehicle is located at the end point of the second road segment, thereby localizing the vehicle at the second time-point to the end point of the second road segment.

19. The method of claim 7, wherein each road segment has a predetermined length, and wherein comparing the measured road profile with the first reference road profile comprises comparing a last predetermined length of the measured road profile with the first reference road profile to identify a time of peak correlation, and wherein the first time-point is the time of peak correlation.

20. The method of claim 1, wherein determining the second location of the vehicle at the second point in time using the terrain-based localization system only occurs when the distance traveled by the vehicle after the first point in time exceeds the predetermined threshold distance.

21. The method of claim 1, wherein determining the first location of the vehicle comprises determining a time point of maximum correlation between the determined information and the reference road surface information.

22. The method of claim 7, wherein comparing the measured road profile with the first reference road profile only occurs when the approximate location of the vehicle is within the threshold distance of the end point.

23. The method of claim 7, wherein determining the first time-point at which the vehicle is located at the end point of the first road segment comprises determining a time point of maximum correlation between the measured road profile and the first reference road profile.

* * * * *